(12) United States Patent
Oonishi

(10) Patent No.: US 11,389,963 B2
(45) Date of Patent: Jul. 19, 2022

(54) ROBOT SYSTEM INCLUDING FEED DEVICE, AND FEED TABLE DEVICE

(71) Applicant: Fanuc Corporation, Yamanashi (JP)

(72) Inventor: Takurou Oonishi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 400 days.

(21) Appl. No.: 16/589,790

(22) Filed: Oct. 1, 2019

(65) Prior Publication Data

US 2020/0108504 A1 Apr. 9, 2020

(30) Foreign Application Priority Data

Oct. 3, 2018 (JP) .............................. JP2018-188511

(51) Int. Cl.
*B25J 9/16* (2006.01)
*B25J 9/00* (2006.01)
*B25J 13/08* (2006.01)

(52) U.S. Cl.
CPC ........... *B25J 9/1694* (2013.01); *B25J 9/0093* (2013.01); *B25J 13/088* (2013.01)

(58) Field of Classification Search
CPC ...................................... B25J 9/16; B25J 9/00
See application file for complete search history.

(56) References Cited

U.S. PATENT DOCUMENTS

| 5,644,951 A * | 7/1997 | Hatamura | B23Q 1/34 |
| | | | 74/424.72 |
| 5,868,545 A * | 2/1999 | Kasai | B65G 65/00 |
| | | | 414/808 |
| 2004/0219005 A1* | 11/2004 | Tanaka | B24B 9/148 |
| | | | 414/788.1 |
| 2014/0083359 A1* | 3/2014 | Miyake | B41F 15/08 |
| | | | 118/697 |
| 2019/0344436 A1* | 11/2019 | Hashimoto | B23P 19/00 |

FOREIGN PATENT DOCUMENTS

| JP | 55113396 A | 9/1980 |
| JP | 60015327 A | 1/1985 |
| JP | 60-031950 U | 3/1985 |
| JP | 03238232 A | 10/1991 |

* cited by examiner

*Primary Examiner* — Kira Nguyen
(74) *Attorney, Agent, or Firm* — RatnerPrestia

(57) ABSTRACT

A robot system that simplifies a configuration and control sequence of a feed table device. The robot system includes a robot, a first table and a second table, a first feed device that feeds the first table, a second feed device that feeds the second table, an interlocking member that works the first feed device and the second feed device in synchronization with each other, and a control device that controls a first operation of the robot for a process and also controls a second operation, which is different from the first operation, of the robot for manipulating the interlocking member. The robot manipulates the interlocking member by the second operation, and thus respectively disposes the first table and the second table in a position corresponding to the process.

6 Claims, 16 Drawing Sheets

ROBOT SYSTEM INCLUDING FEED DEVICE, AND FEED TABLE DEVICE

CROSS-REFERENCE TO RELATED APPLICATIONS

This application is a new U.S. Patent Application that claims benefit of Japanese Patent Application No. 2018-188511, dated Oct. 3, 2018, the disclosure of this application is being incorporated herein by reference in its entirety for all purposes.

BACKGROUND OF THE INVENTION

1. Field of the Invention

The present invention relates to a robot system including a feed device; and a feed table device.

2. Description of the Related Art

A feed table device that raises and lowers a work table is known (e.g., JP S60-31950 U). In the related art, there is a need for a technique to simplify a configuration and a control sequence of the feed table device.

SUMMARY OF THE INVENTION

In an aspect of the present disclosure, a robot system includes a robot a first table on which the robot carries out a work; a second table on which the robot carries out a work; a first feed device configured to feed the first table; a second feed device configured to feed the second table; an interlocking member configured to interlock the motions of the first feed device and the second feed device; and a control device configured to control a first operation of the robot for the work and a second operation of the robot, which is different from the first operation, for manipulating the interlocking member, wherein the robot respectively disposes the first table and the second table in positions in response to the work, by manipulating the interlocking member in the second operation.

In another aspect of the present disclosure, a feed table device includes a first table; a second table; a first feed screw device configured to move the first table; a second feed screw device configured to cause interlocked-feeding motions of the first feed screw device (14) and the second feed screw device (16), under a driving force from the outside.

According to the present disclosure, in comparison to a case in which a drive device is provided for each of a plurality of feed devices, as in related art, it is not necessary to generate a control sequence for each of the drive devices, and further, the number of drive devices can be reduced. Accordingly, the configuration and control sequence of the feed table device can be simplified.

DETAILED DESCRIPTION

Figure 1:
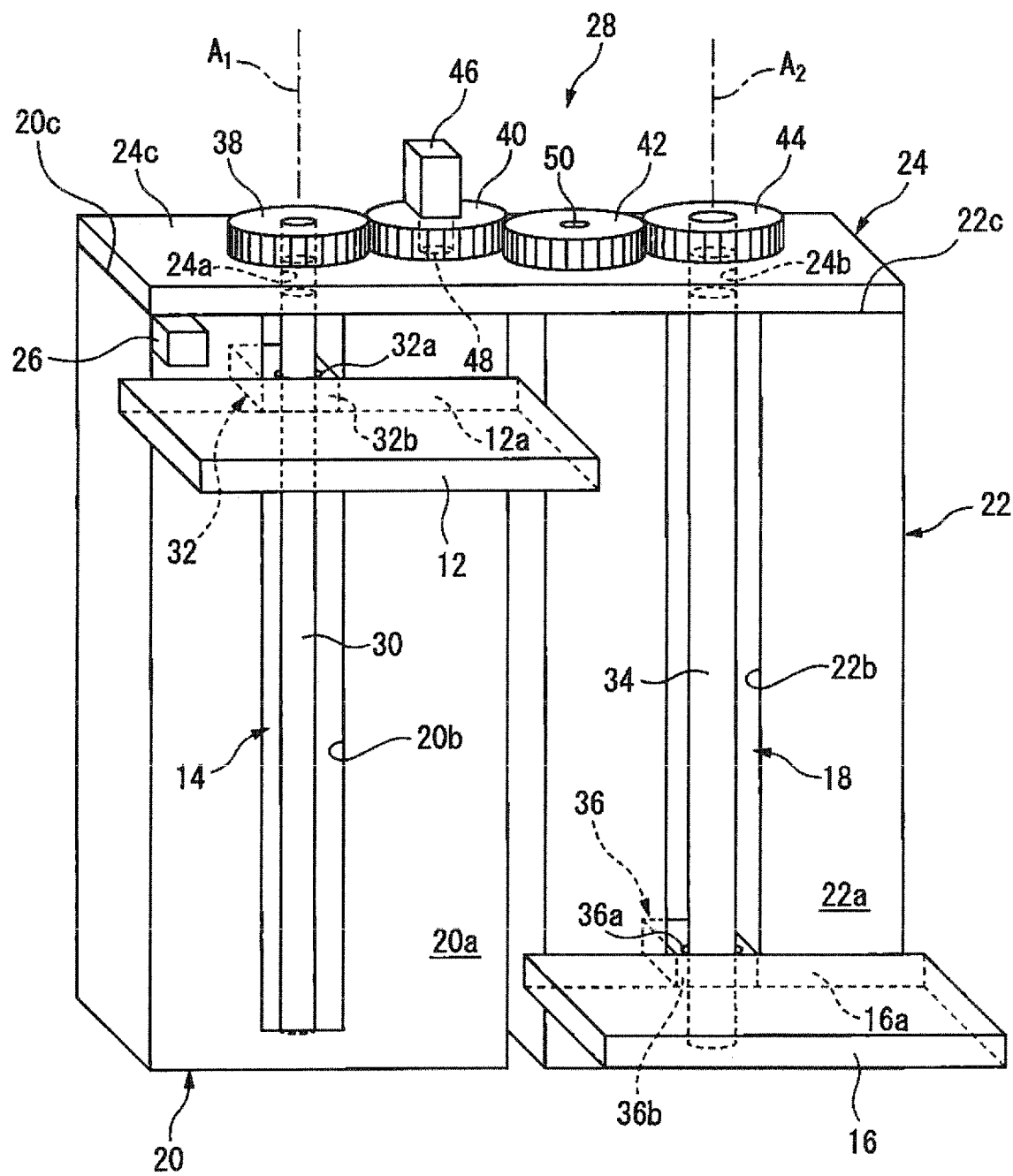
FIG. 1 is a diagram of a feed table device according to an embodiment.

Embodiments of the present disclosure will be described in detail below with reference to the drawings. Note that, in the various embodiments to be described below, the same reference numerals will be given to similar components, and redundant descriptions thereof will be omitted. Further, in the following description, an orthogonal coordinate system in the drawings is used as a reference of directions, and the x-axis positive direction is referred to as rightward direction, the y-axis positive direction is referred to as frontward direction, and the z-axis positive direction is referred to as upward direction, for the sake of convenience.

Figure 2:
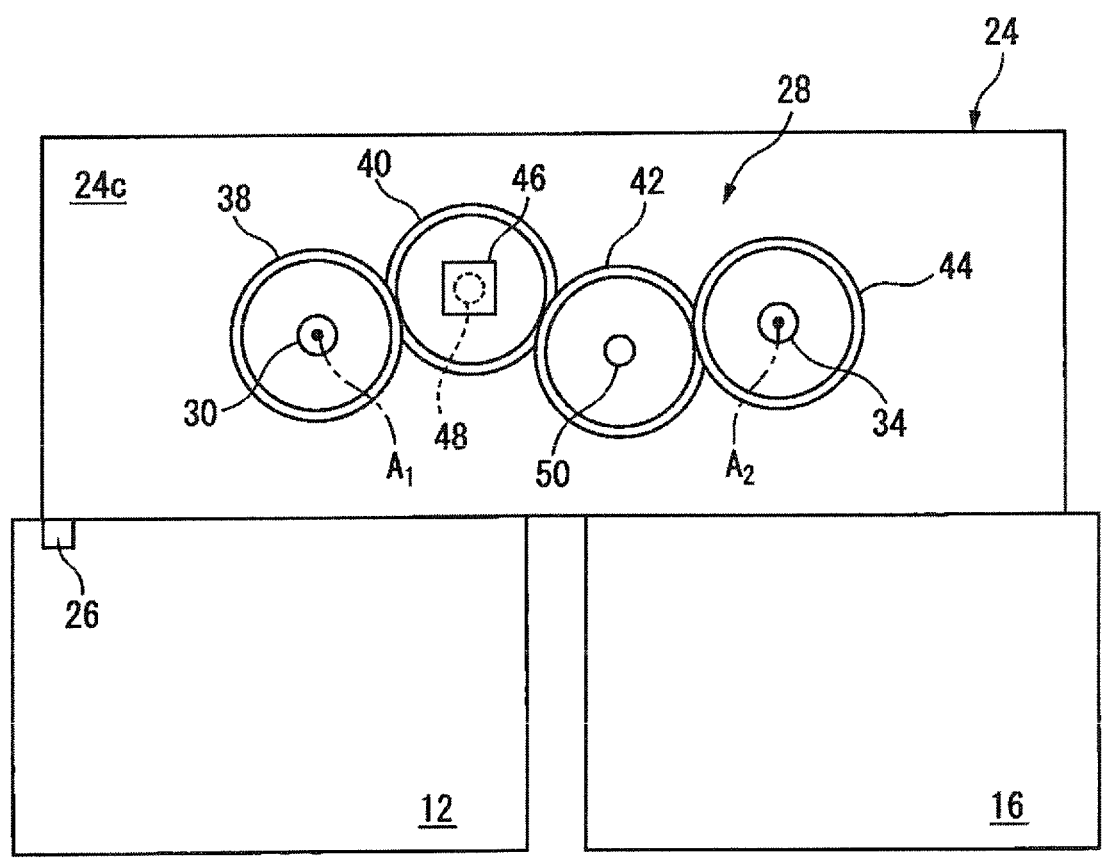
FIG. 2 is a diagram of the feed table device illustrated in FIG. 1, as viewed from upward.

First, a feed table device 10 according to an embodiment is described with reference to FIG. 1 and FIG. 2. The feed table device 10 is for raising and lowering a pallet on which a workpiece is set. Note that the workpiece and the pallet will be described later. The feed table device 10 includes a first table 12, a first feed device 14, a second table 16, a second feed device 18, a first housing 20, a second housing 22, a top plate 24, a position sensor 26, and an interlocking mechanism 28.

The first housing 20 is hollow, and a rear surface 20a thereof is formed with a through-hole 20b extending in the z-axis direction. The first table 12 is disposed rear side of the rear surface 20a of the first housing 20 so as to be movable in the z-axis direction. In the present embodiment, the first table 12 is a flat plate member having a substantially rectangular outer shape, which is disposed substantially parallel to the x-y plane.

The second housing 22 is disposed adjacent to the right side of the first housing 20, and has the same configuration as the first housing 20. Specifically, the second housing 22 is hollow, and a rear surface 22a thereof is formed with a through-hole 22b extending in the z-axis direction.

The second table 16 is disposed rear side of the rear surface 22a of the second housing 22 so as to be movable in the z-axis direction at a position adjacent to the right side of the first table 12. In the present embodiment, the second table 16 is a flat plate member having the same outer shape as the first table 12.

The first feed device 14 feeds the first table 12 in the z-axis direction. Specifically, the first feed device 14 is a ball screw device having a screw shaft 30 and a nut member 32. The screw shaft 30 is a circular column shaped member having a central axis $A_1$, and an outer circumferential surface thereof is formed with a helical screw portion. The screw shaft 30 extends in the z-axis direction such that the central axis $A_1$ thereof is substantially parallel to the z-axis, and is supported by the first housing 20 so as to be rotatable about the central axis $A_1$.

The nut member 32 is disposed inside the first housing 20, and a rear end 32b of the nut member 32 is fixed to a front end 12a of the first table 12 through the through-hole 20b of the first housing 20. A screw hole 32a is formed in a center of the nut member 32. The screw shaft 30 is inserted into the screw hole 32a, and screw-engaged with the screw hole 32a.

In the present embodiment, as the screw shaft 30 is rotated in the clockwise direction as viewed from upward, the nut member 32 and the first table 12 fixed to the nut member 32 are moved downward. Conversely, as the screw shaft 30 is rotated in the counterclockwise direction as viewed from upward, the nut member 32 and the first table 12 are moved upward. In this way, the first feed device 14 converts the rotational motion of the screw shaft 30 into the feeding motion of the first table 12 in the z-axis direction.

The second feed device 18 feeds the second table 16 in the z-axis direction. Specifically, the second feed device 18 is a ball screw device similar to the first feed device 14, and includes a screw shaft 34 and a nut member 36. The screw shaft 34 is a circular column shaped member having a central axis $A_2$, and an outer circumferential surface thereof is formed with a helical screw portion. The screw shaft 34 extends in the z-axis direction such that the central axis $A_2$ thereof is substantially parallel to the z-axis, and is supported by the second housing 22 so as to be rotatable about the central axis $A_2$.

The nut member 36 is disposed inside the second housing 22, and a rear end 36b of the nut member 36 is fixed to a front end 16a of the second table 16 through the through-hole 22b of the second housing 22. A screw hole 36a is formed in a center of the nut member 36. The screw shaft 34 is inserted into the screw hole 36a and screw-engaged with the screw hole 36a.

In the present embodiment, as the screw shaft 34 is rotated in the clockwise direction as viewed from upward, the nut member 36 and the second table 16 fixed to the nut member 36 are moved downward. Conversely, as the screw shaft 34 is rotated in the counterclockwise direction as viewed from upward, the nut member 36 and the second table 16 are moved upward. In this way, the second feed device 18 converts the rotational motion of the screw shaft 34 into the feeding motion of the second table 16 in the z-axis direction.

The top plate 24 is fixed on an upper surface 20c of the first housing 20 and on an upper surface 22c of the second housing 22. A first through-hole 24a and a second through-hole 24b are formed in the top plate 24. The screw shaft 30 of the first feed device 14 is inserted into the first through-hole 24a, while the screw shaft 34 of the second feed device 18 is inserted into the second through-hole 24b.

In the present embodiment, the position sensor 26 is e.g. a proximity switch, and detects an object located at a position close to the lower side of the position sensor 26 (specifically, a position separate downward from the position sensor 26 by a predetermined distance), in a non-contact manner. The position sensor 26 is installed on the upper end of the rear surface 20a of the first housing 20. The position sensor 26 outputs a detection signal (i.e., the detection signal is turned "ON") when the position sensor 26 detects that an object is disposed at a position close to the lower side thereof.

The interlocking mechanism 28 includes a total of four interlocking members 38, 40, 42, and 44. Each of the interlocking members 38, 40, 42, and 44 is a circular column shaped gear having teeth formed on an outer circumferential surface thereof. These interlocking members 38, 40, 42, and 44 constitute a gear train disposed between the screw shaft 30 of the first feed device 14 and the screw shaft 34 of the second feed device 18.

The interlocking member 38 is disposed to be substantially concentric with the screw shaft 30 of the first feed device 14 with respect to the central axis $A_1$. The screw shaft 30 passes through the first through-hole 24a formed in the top plate 24, and the upper end of the screw shaft 30 is fixed to the interlocking member 38. The interlocking member 38 and the screw shaft 30 rotate integrally with each other.

On the other hand, the interlocking member 44 is disposed to be substantially concentric with the screw shaft 34 of the second feed device 18 with respect to the central axis $A_2$. The screw shaft 34 passes through the second through-hole 24b formed in the top plate 24, and the upper end of the screw shaft 34 is fixed to the interlocking member 44. The interlocking member 44 and the screw shaft 34 rotate integrally with each other.

The interlocking member 40 is disposed adjacent to the right side of the interlocking member 38, and engages with the interlocking member 38. The interlocking member 40 has a central hole into which a pin 48 is inserted. The pin 48 is provided on the top plate 24 so as to protrude from an upper surface 24c of the top plate 24. The interlocking member 38 is rotatable about the pin 48.

In the present embodiment, a handling portion 46 is provided at the interlocking member 40. The handling portion 46 is a substantially square cylindrical member, and fixedly provided on an upper surface of the interlocking member 40 so as to rotate integrally with the interlocking member 40. The handling portion 46 is disposed to be substantially concentric with the pin 48 (i.e., the interlocking member 40).

The interlocking member 42 is interposed between the interlocking members 40 and 44, and engages with the interlocking members 40 and 44. The interlocking member 42 has a central hole into which a pin 50 is inserted. The pin 50 is provided on the top plate 24 so as to protrude from the upper surface 24c of the top plate 24. The interlocking member 42 is rotatable about the pin 50.

In the present embodiment, the number of teeth of the interlocking members 38, 40, 42, and 44 are the same as each other. Therefore, the gear ratio (i.e., a reduction ratio) of two interlocking members 38 and 40, 40 and 42, and 42 and 44, that engage with each other, is "1". Further, the movement amount (i.e., the movement distance in the z-axis direction) of the first table 12 per revolution of the screw shaft 30 of the first feed device 14 is the same as the movement amount of the second table 16 per revolution of the screw shaft 34 of the second feed device 18.

Next, an operation of the feed table device 10 is described. The feed table device 10 is operated under a driving force from the outside (e.g., a robot). Specifically, when the driving force is applied to the handling portion 46 from the outside such that the handling portion 46 is rotated in the clockwise direction as viewed from upward, the interlocking member 40 is rotated in the clockwise direction as viewed from upward, together with the handling portion 46.

In accordance with the rotation of the interlocking member 40, the interlocking members 38 and 42 are rotated in the counterclockwise direction as viewed from upward. Together with the rotation of the interlocking member 38, the screw shaft 30 of the first feed device 14 is rotated in the counterclockwise direction as viewed from upward, whereby the first table 12 is moved upward.

Further, in accordance with the rotation of the interlocking member 42 in the counterclockwise direction as viewed from upward, the interlocking member 44 is rotated in the clockwise direction as viewed from upward. Together with the rotation of the interlocking member 44, the screw shaft 34 of the second feed device 18 is rotated in the clockwise direction as viewed from upward, whereby the second table 16 is moved downward.

Conversely, when the handling portion 46 (i.e., the interlocking member 40) is rotated in the counterclockwise direction as viewed from upward due to the driving force from the outside, the interlocking members 38 and 42 is rotated in the clockwise direction as viewed from upward and the first table 12 is moved downward, while the interlocking member 44 is rotated in the counterclockwise direction as viewed from upward and the second table 16 is moved upward.

In this way, the interlocking members 38, 40, 42, and 44 interlock the motions of the first feed device 14 and the second feed device 18 under the driving force from the outside, and move the first table 12 and the second table 16 in directions opposite to each other. Further, since the interlocking members 38, 40, 42, and 44 engage with each other so as to rotate simultaneously, the first table 12 and the second table 16 is moved in synchronization with each other.

Furthermore, the number of teeth of the interlocking members 38, 40, 42, and 44 is the same, and the movement amount of the first table 12 per revolution of the screw shaft 30 is the same as the movement amount of the second table 16 per revolution of the screw shaft 34, as described above. Accordingly, when the interlocking mechanism 28 is operated, the first table 12 and the second table 16 is moved in the z-axis direction by the same distance.

Thus, in the present embodiment, the plurality of feed devices 14 and 18 can be operated in an interlocked manner, simply by applying the driving force to one interlocking member 40 (the handling portion 46). According to this configuration, when compared with a case where a plurality of drive devices (typically, servomotors) are provided for the respective feed devices as in the related art, it is not necessary to prepare a control sequence for each of the drive devices, and also it is possible to reduce the number of drive devices.

Accordingly, the configuration and control sequence of the feed table device 10 can be simplified. In addition, since the interlocking mechanism 28 is configured by the interlocking members 38, 40, 42, and 44, which are gears, the configuration of the interlocking mechanism 28 can be simplified and manufacturing costs can be reduced.

Note that, in the present embodiment, the four interlocking members 38, 40, 42, and 44 are provided. However, the interlocking mechanism 28 may include 2n interlocking members ("n" is an integer of 1 or greater). In this case, the first table 12 and the second table 16 can be moved in opposite directions so as to be interlocked with each other, by rotating one interlocking member.

Next, a robot system 60 according to an embodiment is described with reference to FIG. 3. The robot system 60 includes a robot 62, a control device 64, and the feed table device 10. The robot 62 is a vertical articulated robot, and includes a robot base 66, a turning body 68, a robot arm 70, a wrist 72, and an end effector 74.

The robot base 66 is fixed on a floor of a work cell. The turning body 68 is provided at the robot base 66 so as to be rotatable about a vertical axis. The robot arm 70 includes a lower arm 76 rotatably attached to the turning body 68, and an upper arm 78 rotatably attached to a distal end of the lower arm 76.

The wrist 72 is coupled to a distal end of the upper arm 78. The end effector 74 is attached to the wrist 72 and the wrist 72 rotatably supports the end effector 74. In the present embodiment, the end effector 74 is a robot hand including a plurality of openable and closable fingers 80.

Servomotors (not illustrated) are built in the respective components of the robot 62 (i.e., the robot base 66, the turning body 68, the robot arm 70, the wrist 72). A robot coordinate system $C_R$ is set for the robot 62. In the present embodiment, the robot coordinate system $C_R$ is set such that the origin thereof is arranged at the robot base 66, the z-axis thereof is parallel with the vertical direction, and the turning body 68 is rotated about the z-axis.

The control device 64 includes a processor (a CPU, a GPU, etc.) and a memory (a ROM, a RAM, etc.), and controls the robot 62. Specifically, the control device 64 generates a command to each servomotor of the robot 62 with reference to the robot coordinate system $C_R$, and drives each servomotor so as to arrange the end effector 74 at a target position and orientation. Further, the control device 64 is communicably connected to the position sensor 26, and receives the above-described detection signal from the position sensor 26.

Figure 4:
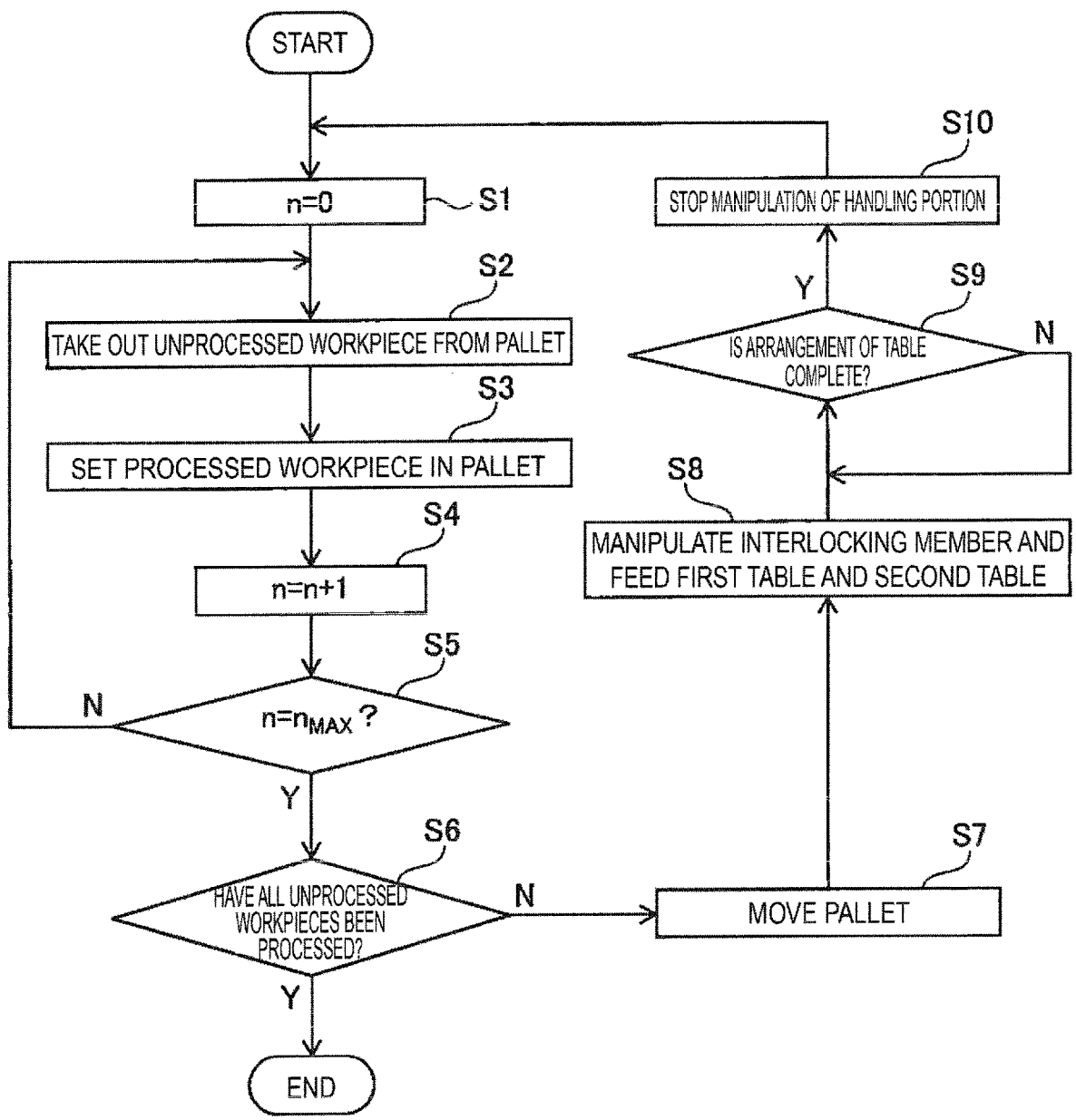
FIG. 4 is a flowchart illustrating an example of an operation flow of the robot system illustrated in FIG. 3.
Figure 5:
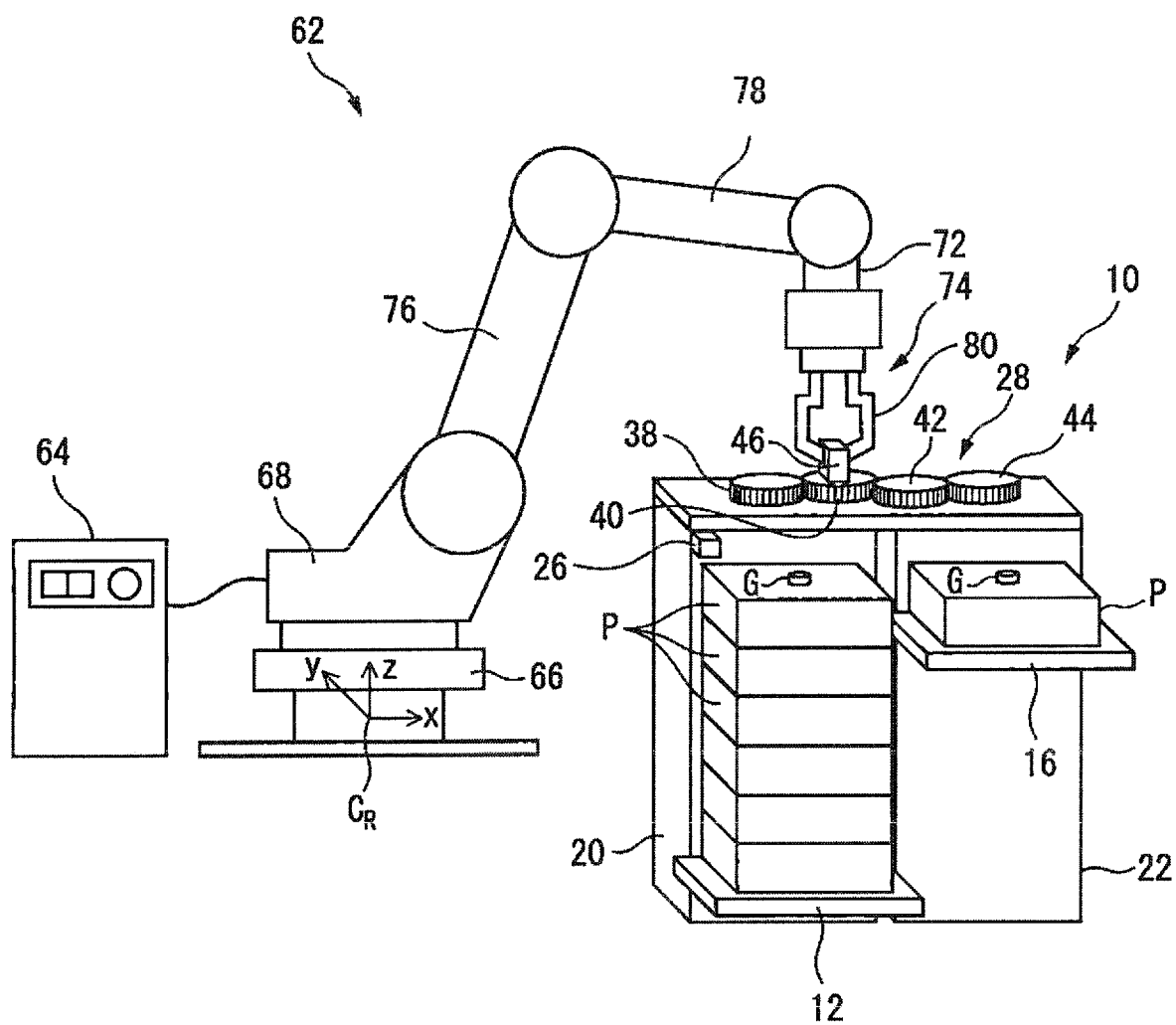
FIG. 5 illustrates a state at a start of the flow illustrated in FIG. 4.

Next, an operation of the robot system 60 is described with reference to FIG. 4 to FIG. 7. A flow illustrated in FIG. 4 is started when the control device 64 receives a work-start command from an operator, a host control device, or a robot program. In the present embodiment, as illustrated in FIG. 5, a total of six pallets P, in each of which unprocessed workpieces (not illustrated) are set, are placed on the first table 12, at the start of the flow shown in FIG. 4. A total of $n_{MAX}$ workpieces are set in each of the six pallets P on the first table 12.

On the other hand, one empty pallet P, in which no workpiece is set, is placed on the second table 16. At the start of the flow illustrated in FIG. 4, the upper surface of the uppermost pallet P on the first table 12 and the upper surface of the pallet P on the second table 16 are positioned substantially on the same plane. Further, the pallets P have the same shape as each other, and each includes a gripping portion G. The gripping portion G has a shape that can be gripped by the end effector 74.

At step S1, the control device 64 sets to zero the number "n" indicative of a total number for which the robot 62 has taken out the unprocessed workpiece set in the uppermost pallet P on the first table 12 (i.e., the number of times steps S2 and S3 described below have been carried out).

At step S2, the control device 64 operates the robot 62 so as to take out one unprocessed workpiece from the uppermost pallet P of the pallets P placed on the first table 12. In this regard, the control device 64 previously acquires position data in the robot coordinate system $C_R$ of each unprocessed workpiece set in the uppermost pallet P on the first table 12.

The position of the uppermost pallet P on the first table 12 is defined as the position detected by the position sensor 26 (e.g., a position separate downward from the position sensor 26 by a distance within 1 mm). Also, each of the pallets P is placed at a predetermined position on the first table 12. For example, a jig (not illustrated) is provided on the first table 12, and the bottommost pallet P placed on the first table 12 is positioned at the predetermined position on the first table 12 by the jig.

Further, a positioning protrusion (not illustrated) is formed on the upper surface of one pallet P, while a positioning hole (not illustrated) that receives the positioning protrusion is formed on the bottom surface of another pallet P placed on the one pallet P. By the engagement between the positioning protrusion and the positioning hole, the another pallet P is positioned at the same position in the x-y plane as the one pallet P.

In addition, a pallet jig (not illustrated) is formed inside of each pallet P, and each of the unprocessed workpieces is set at a predetermined position in each pallet P by the pallet jig. In this manner, the positions in the x-y plane of the unprocessed workpieces set in the respective pallets P can be uniformed, and accordingly, each unprocessed workpiece set in the uppermost pallet P on the first table 12 is positioned at the predetermined position in the robot coordinate system $C_R$. The control device 64 acquires the position in the robot coordinate system $C_R$ of each unprocessed workpiece set in the uppermost pallet P, and stores it in the memory.

At this step S2, the control device 64 controls the robot 62 using the position data of the unprocessed workpieces in the uppermost pallet P on the first table 12, so as to grip the unprocessed workpiece by the end effector 74, transfer the gripped unprocessed workpiece to the interior of a processing machine (not illustrated) installed outside the robot system 60, and set it therein. In this way, the unprocessed workpiece is loaded into the processing machine by the robot 62, and the processing machine processes the unprocessed workpiece. Thus, at step S2, the robot 62 carries out a loading work in which the robot 62 takes out the workpiece from the pallet P on the first table 12 and loads the workpiece into the processing machine.

At step S3, the control device 64 operates the robot 62 so as to take out a processed workpiece from the processing machine, and set the processed workpiece in the pallet P placed on the second table 16. In this regard, the control device 64 previously acquires position data in the robot coordinate system $C_R$ of a set position in which the processed workpiece is to be set in the uppermost pallet P on the second table 16.

The control device 64 grips and takes out the processed workpiece set in the processing machine by the end effector 74, and controls the robot 62 using the set position data so as to set the processed workpiece at the set position in the uppermost pallet P on the second table 16. In this way, the processed workpiece is unloaded from the processing machine by the robot 62. Thus, at step S3, the robot 62 carries out an unloading work in which the robot 62 unloads the processed workpiece from the processing machine and sets it in the pallet P on the second table 16.

At step S4, the control device 64 increments the above-described total number "n" by 1 (i.e., n=n+1). At step S5, the control device 64 determines whether the total number "n" has reached $n_{MAX}$ (i.e., $n=n_{max}$). This $n_{MAX}$ is the total number of unprocessed workpieces set in each pallet P on the first table 12.

When the control device 64 determines that $n=n_{MAX}$ (i.e., determines YES), the control device 64 proceeds to step S6, while the control device 64 returns to step S2 when it determines that $n<n_{MAX}$ (i.e., determines NO). In this way, the control device 64 repeatedly executes a loop of steps S2 to S5 until it determines YES at step S5 in order to carry out the loading work and the unloading work for the total of $n_{MAX}$ unprocessed workpieces set in the uppermost pallet P on the first table 12.

At step S6, the control device 64 determines whether all of the unprocessed workpieces (i.e., $6 \times n_{MAX}$ unprocessed workpieces) placed on the first table 12 at the start of the flow illustrated in FIG. 4 have been processed. For example, the control device 64 counts the number of times "m" for which the control device 64 determines YES at step S5, and at this step S6, the control device 64 determines whether the number "m" has reached a total number of "6" of the pallets P placed on the first table 12 at the start of the flow illustrated in FIG. 4.

When m=6 is satisfied, the control device 64 determines that all of the unprocessed workpieces have been processed (i.e., determines YES), and ends the flow illustrated in FIG. 4. On the other hand, when m<6 is satisfied, the control device 64 determines that there is the unprocessed workpiece on the first table 12 (i.e., determines NO), and proceeds to step S7.

At step S7, the control device 64 operates the robot 62 so as to transfer the uppermost pallet P on the first table 12 to the upside of the uppermost pallet P on the second table 16. At the start of step S7, the uppermost pallet P on the first table 12 is empty, and there is no unprocessed workpiece set therein. In this regard, the control device 64 previously acquires position data in the robot coordinate system $C_R$ of the gripping portion G of the uppermost pallet P on the first table 12.

The control device 64 controls the robot 62 using the position data of the gripping portion G so as to grip and lift the gripping portion G by the end effector 74 and set the gripped uppermost pallet P on the uppermost pallet P on the second table 16. In this way, the empty uppermost palette P on the first table 12 is transferred by the robot 62 to the uppermost position on the second table 16. Thus, at step S7, the robot 62 carries out a pallet-transferring work in which the robot 62 transfers the pallet P on the first table 12 to the second table 16.

As described above, the robot 62 carries out the loading work at step S2, the unloading work at step S3, and the pallet-transferring work at step S6, on the first table 12 and the second table 16. In the present embodiment, the operation of the robot 62 for carrying out these works is referred to as a normal operation (a first operation).

At step S8, the control device 64 causes the robot 62 to manipulate the interlocking members 38, 40, 42, and 44 so as to feed the first table 12 and the second table 16. In this regard, the control device 64 previously acquires the position data in the robot coordinate system $C_R$ of the handling portion 46 (e.g., the central axis).

At this step S8, the control device 64 controls the robot 62 using the position data of the handling portion 46 so as to arrange the end effector 74 at a gripping position for gripping the handling portion 46 by the end effector 74. When the end effector 74 is arranged at this gripping position, the handling portion 46 is arranged between the fingers 80 of the end effector 74. At this time, the end effector 74 may be arranged relative to the handling portion 46 such that two fingers 80 face two opposite sides of the square handling portion 46, respectively.

Then, the control device 64 operates the end effector 74 so as to close the fingers 80. Whereby, the end effector 74 grips the handling portion 46 by the fingers 80. Then, the control device 64 operates the robot 62 so as to rotate the handling portion 46 gripped by the end effector 74 in the clockwise direction as viewed from upward.

By this operation, the interlocking members 38, 40, 42, and 44 cause the interlocked-feeding motions of the first feed device 14 and the second feed device 18 as described above, whereby moving the first table 12 upward in synchronization with moving the second table 16 downward. In this way, the control device 64 controls the robot 62 so as to cause the robot 62 to carry out an interlocking operation (a second operation) for manipulating the interlocking members 38, 40, 42 and 44, which is different from the normal operation of the robot 62.

At step S9, the control device 64 determines whether the first table 12 and the second table 16 are disposed at positions for subsequent work by the robot 62 (i.e., the loading work and the unloading work). Specifically, the control device 64 determines whether it receives the detection signal from the position sensor 26.

In this regard, the uppermost pallet P on the first table 12 at the end of step S7 described above is the second one from the top of the pallets P on the first table 12 illustrated in FIG. 5. Thus, the uppermost pallet P on the first table 12 at the end of step S7 is separated downward from the detection position of the position sensor 26, and therefore the detection signal from the position sensor 26 is turned OFF at the end of the step S7.

When the first table 12 is moved upward at step S8 from the state at the end of the step S7 such that the uppermost pallet P on the first table 12 reaches the position close to the lower side of the position sensor 26, the position sensor 26 turns the detection signal ON, and transmits it to the control device 64. The control device 64 determines YES when the detection signal from the position sensor 26 is ON, and proceeds to step S10. On the other hand, when the detection signal from the position sensor 26 is OFF, the control device 64 repeats step S9.

In this way, the position sensor 26 detects the positions of the first table 12 and the second table by detecting the position of the uppermost pallet P on the first table 12, and the control device 64 controls the interlocking operation of the robot 62 on the basis of the detection result of the position sensor 26 (i.e., the ON/OFF detection signal).

Figure 6:
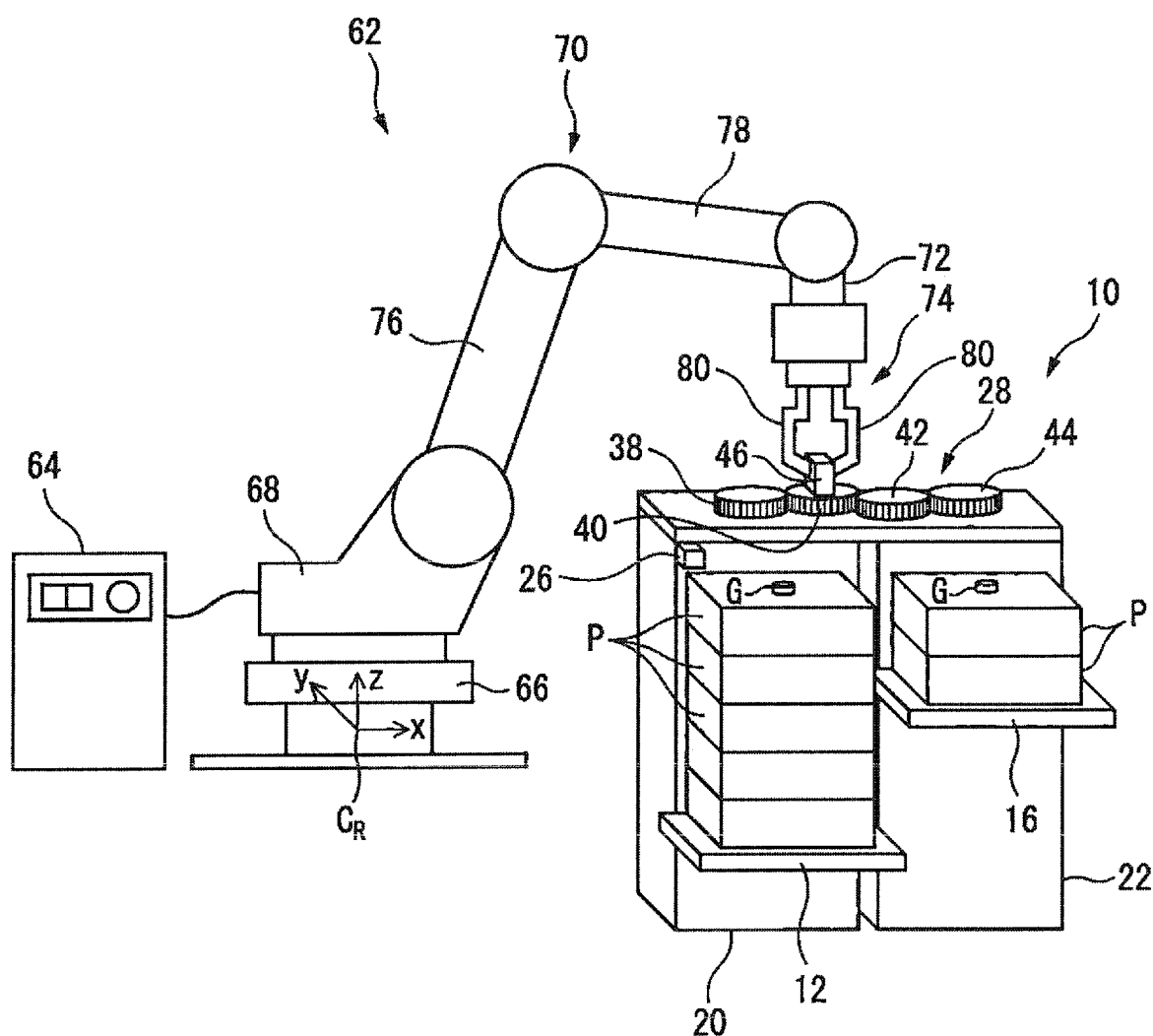
FIG. 6 illustrates a state when step S10 illustrated in FIG. 5 is completed a first time.

At step S10, the control device 64 stops the rotation of the handling portion 46 by the robot 62. Whereby, the operations of the interlocking mechanism 28, the first table 12, and the second table 16 are stopped. The state at this time is illustrated in FIG. 6. In the state illustrated in FIG. 6, the upper surface of the uppermost pallet P on the first table 12 is positioned substantially in the same plane as the upper surface of the uppermost pallet P on the second table 16.

Figure 7:
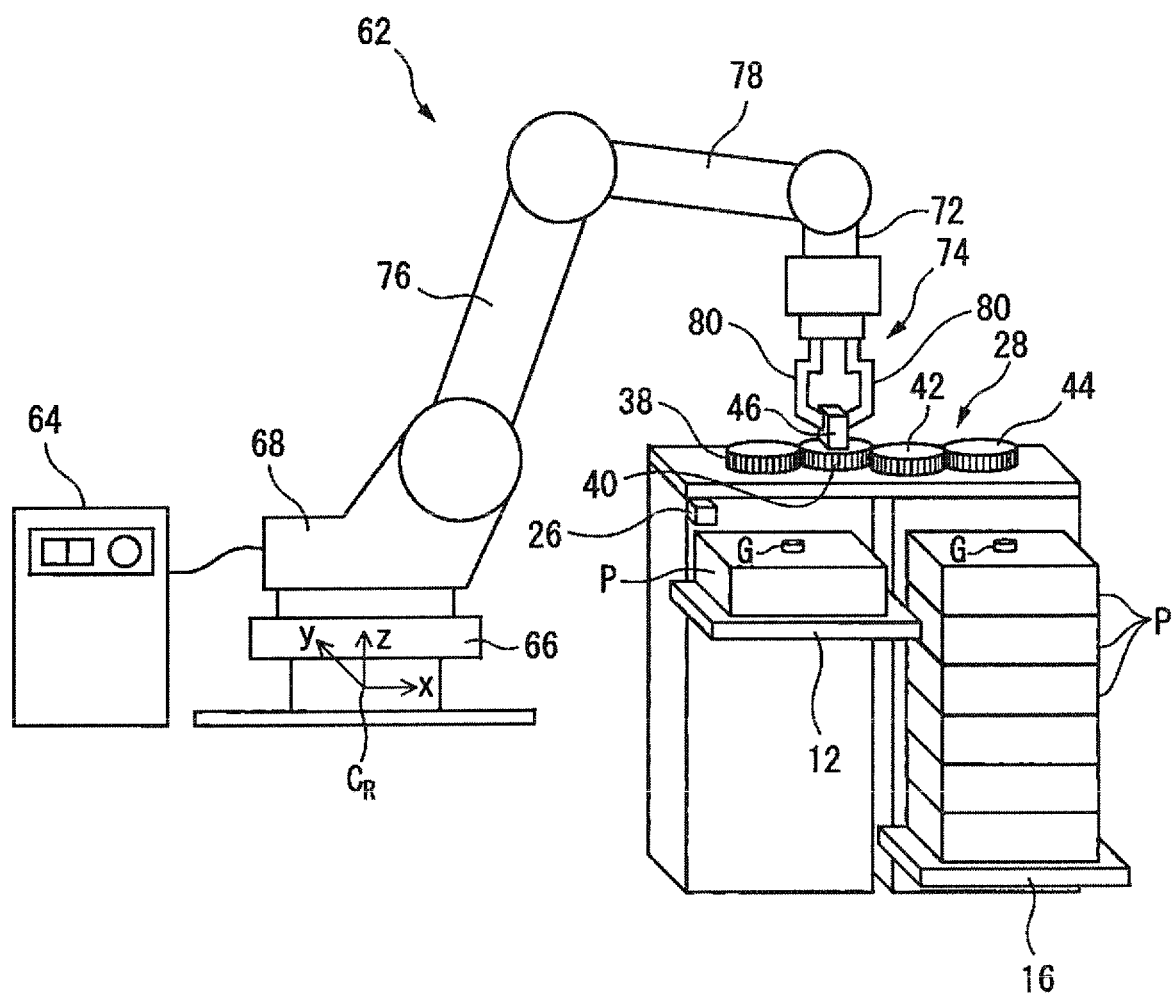
FIG. 7 is a diagram for describing a state of pallets placed on first and second tables when YES is determined at step S6.

After the end of step S10, the control device 64 returns to step S1, and carries out a loop of steps S1 to S10 until it determines YES at step S6. The state at the time when the control device 64 determines YES at step S6 is illustrated in FIG. 7. In the state illustrated in FIG. 7, the one empty pallet P, in which no unprocessed workpiece is set, is placed on the first table 12, while six pallets P, in each of which the processed workpieces are set, are placed on the second table 16.

As described above, the robot 62 respectively disposes the first table 12 and the second table 16 at the positions in response to the work (the loading work and the unloading work), by manipulating the interlocking members 38, 40, 42, and 44 by means of the interlocking operation. According to this configuration, the robot 62, that carries out the loading work and the unloading work, can be utilized as a drive device configured to apply the driving force to the feed table device 10, and therefore the control sequence and configuration of the robot system 60 can be simplified.

Further, in the present embodiment, the position sensor 26 detects that the uppermost pallet P placed on the first table 12 is arranged at the predetermined position (i.e., the position close to the lower side of the position sensor 26), by which, it is detected that the first table 12 and the second table 16 are disposed at the positions in response to the work (the loading work and the unloading work). Then, the control device 64 controls the interlocking operation of the robot 62 on the basis of the detection result of the position sensor 26. According to this configuration, the control device 64 can precisely dispose the first table 12 and the second table 16 at the positions in response to the work.

Further, in the present embodiment, the interlocking members 38, 40, 42, and 44 move the first table 12 and the second table 16 by the same distance in the opposite directions. According to this configuration, at the end of step S10 described above, the upper surface of the uppermost pallet P on the first table 12 and the upper surface of the uppermost pallet P on the second table 16 can be positioned substantially in the same plane.

Due to this, the target position of the robot 62 (i.e., the position of the unprocessed workpiece set in the uppermost pallet P on the first table 12) when the robot 62 carries out the next step S2 (the loading work), and the target position of the robot 62 (i.e., the set position of the processed workpiece in the uppermost pallet P on the second table 16) at the next step S3 (the unloading work) can be made constant. Thus, the robot 62 can reliably execute steps S2 and S3.

Note that the position sensor 26 may be omitted from the robot system 60. In this case, a relationship between the movement amount of the first table 12 by the first feed device 14, the movement amount of the second table 16 by the second feed device 18, and a manipulation amount of the handling portion 46 (i.e., the interlocking member 40) by the robot 62 is previously acquired.

For example, the relationship indicates a movement amount x of the first table 12 and the second table 16 in the z-axis direction when the handling portion 46 is rotated by a predetermined angle θ (e.g., 1°) as viewed from upward. On the basis of this relationship, a target rotation number (a target rotation angle) for when the robot 62 rotates the handling portion 46 at step S8 is predetermined. The control device 64 pre-stores the target rotation number in the memory.

Then, at step S9, the control device 64 determines whether or not the rotation number of the handling portion 46 rotated by the robot 62 at step S8 reaches the target rotation number. If the control device 64 determines that the rotation number of the handling portion 46 reaches the target rotation number (i.e., determines YES), the control device 64 proceeds to step S10.

On the other hand, when the control device 64 determines that the rotation number of the handling portion 46 does not reach the target rotation number (i.e., determines NO), the control device 64 repeats step S9. According to this configuration, the control device 64 can perform the series of operations at steps S8 to S9 without the position sensor 26, whereby reducing manufacturing costs.

Figure 8:
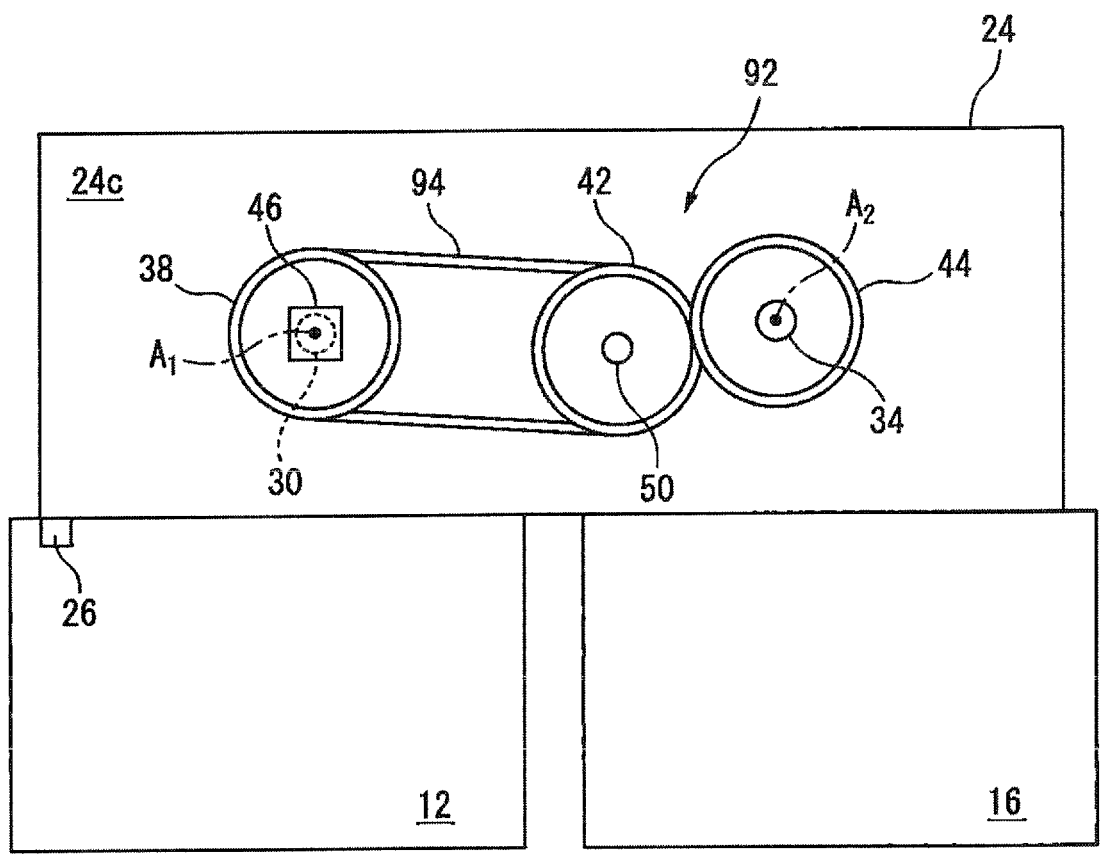
FIG. 8 is a diagram of a feed table device according to another embodiment, as viewed from upward.
Figure 8:
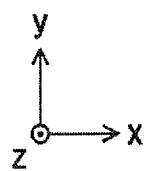

Next, a feed table device 90 according to another embodiment is described with reference to FIG. 8. The feed table device 90 differs from the above-described feed table device 10 in a configuration of an interlocking mechanism 92. The interlocking mechanism 92 includes the above interlocking members 38, 42 and 44, and an interlocking member 94. The interlocking member 94 is e.g. a looped timing belt having teeth formed on an inner circumferential surface thereof.

The interlocking member 94 is strained over the outer circumferential surfaces of the interlocking members 38 and 42, and the teeth formed on the inner circumferential surface of the interlocking member 94 engage with the teeth formed on the outer circumferential surfaces of the interlocking members 38 and 42. Due to this, the rotation of the interlocking member 38 is transmitted to the interlocking members 42 and 44 via the interlocking member 94. In the present embodiment, the reduction ratio of the rotation number of the interlocking member 38 and the rotation number of the interlocking member 42 is "1".

The handling portion 46 is fixedly provided on the upper surface of the interlocking member 38 so as to be substantially concentric with the interlocking member 38 with respect to the axis $A_1$. When the handling portion 46 is rotated about the axis $A_1$ under the driving force from the outside (e.g., the robot 62), the interlocking mechanism 92 moves the first table 12 and the second table 16 in the opposite directions in synchronization with each other, similarly to the interlocking mechanism 28 described above.

Figure 9:
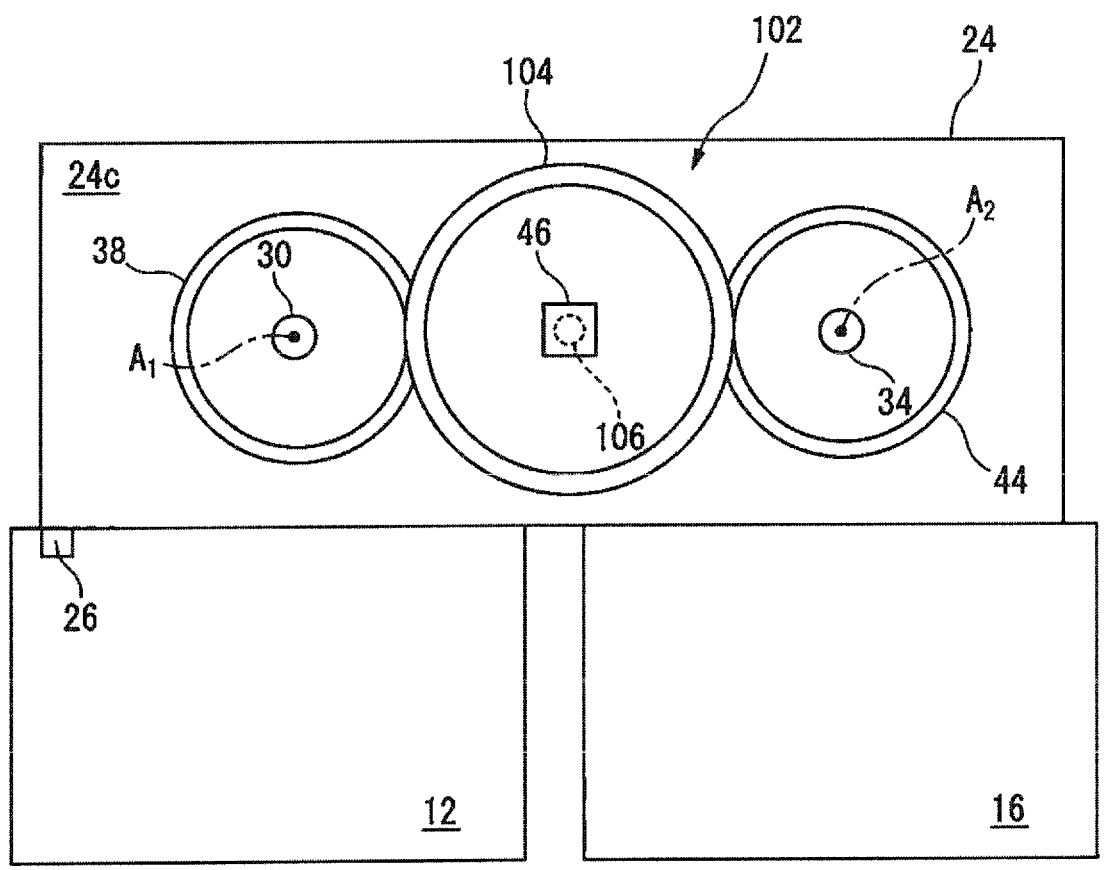
FIG. 9 is a diagram of a feed table device according to still another embodiment, as viewed from upward.

Next, a feed table device 100 according to still another embodiment is described with reference to FIG. 9. The feed table device 100 differs from the above-described feed table device 10 in a configuration of an interlocking mechanism 102. The interlocking mechanism 102 includes the above interlocking members 38 and 44, and an interlocking member 104. The interlocking member 104 is a circular column shaped gear having a central hole, and is interposed between the interlocking members 38 and 44 so as to engage with the interlocking members 38 and 44.

The interlocking member 104 has the central hole, into which a pin 106 is inserted. The pin 106 is provided on the top plate 24 so as to protrude from the upper surface 24c of the top plate 24. The interlocking member 104 is rotatable about the pin 106. In the present embodiment, the number of teeth of the interlocking member 104 is larger than that of the interlocking members 38 and 44. However, the number of teeth of the interlocking member 104 may be equal to or smaller than that of the interlocking members 38 and 44. Since the number of teeth of the interlocking members 38 and 44 is the same, the reduction ratio of the rotation number of the interlocking member 38 and the rotation number of the interlocking member 42 is "1".

The handling portion 46 is fixed on the upper surface of the interlocking member 104 so as to be substantially concentric with the interlocking member 104. When the handling portion 46 is rotated in the clockwise direction as viewed from upward under the driving force from the outside (e.g., the robot 62), the interlocking members 38 and 44, that are engaged with the interlocking member 104, are respectively rotated in the counterclockwise direction as viewed from upward.

In this case, the first table 12 and the second table 16 are moved upward in synchronization with each other. Conversely, when the handling portion 46 is rotated in the counterclockwise direction as viewed from upward, the first table 12 and the second table 16 are moved downward in synchronization with each other. Thus, in the present embodiment, the interlocking mechanism 102 moves the first table 12 and the second table 16 in the same direction in synchronization with each other.

Figure 10:
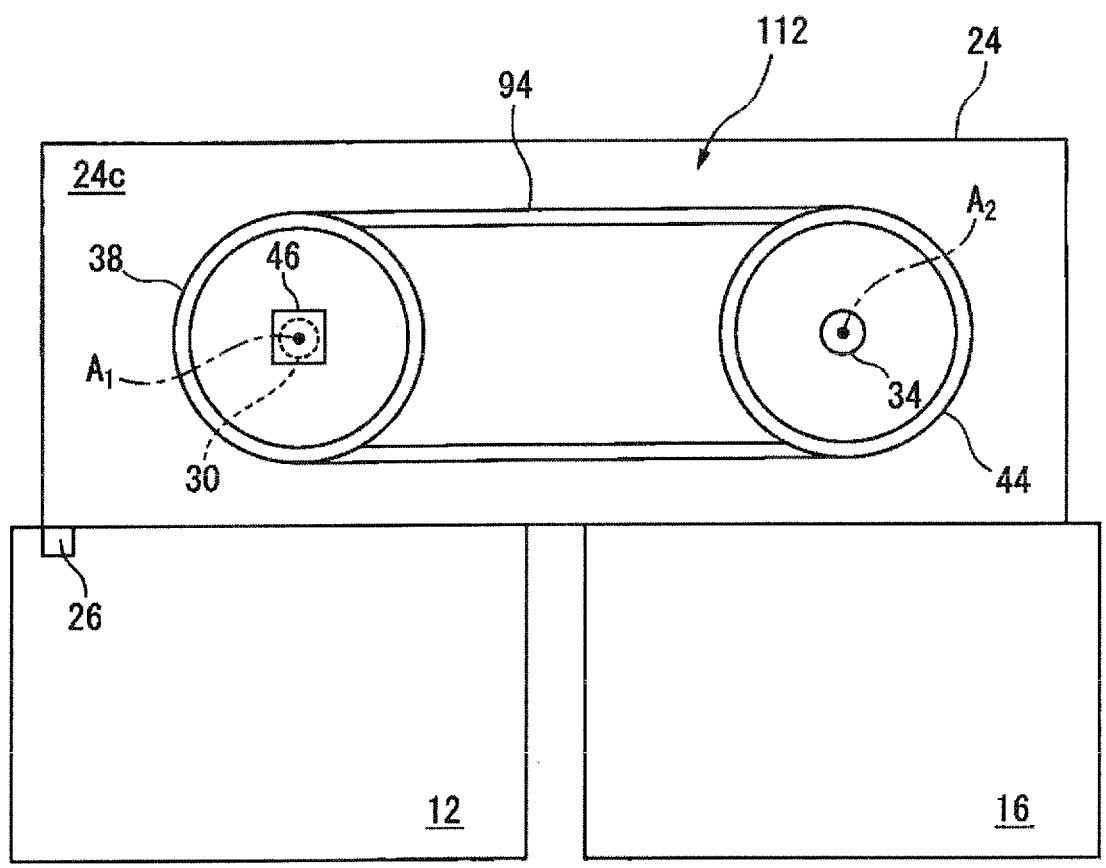
FIG. 10 is a diagram of a feed table device according to still another embodiment, as viewed from upward.

Next, a feed table device 110 according to still another embodiment is described with reference to FIG. 10. The feed table device 110 differs from the above-described feed table device 10 in a configuration of an interlocking mechanism 112. The interlocking mechanism 112 includes the interlocking members 38, 44 and 94. The interlocking member 94 is strained over the outer circumferential surfaces of the interlocking members 38 and 44, and the teeth formed on the inner circumferential surface of the interlocking member 94 engage with the teeth formed on the outer circumferential surfaces of the interlocking members 38 and 44. Thus, the rotation of the interlocking member 38 is transmitted to the interlocking member 44 via the interlocking member 94.

The handling portion 46 is fixed on the upper surface of the interlocking member 38 so as to be concentric with the interlocking member 38 with respect to the axis $A_1$. When the handling portion 46 is rotated about the axis $A_1$ under the driving force from the outside (e.g., the robot 62), the interlocking mechanism 112 moves the first table 12 and the second table 16 in the same direction in synchronization with each other.

Figure 11:
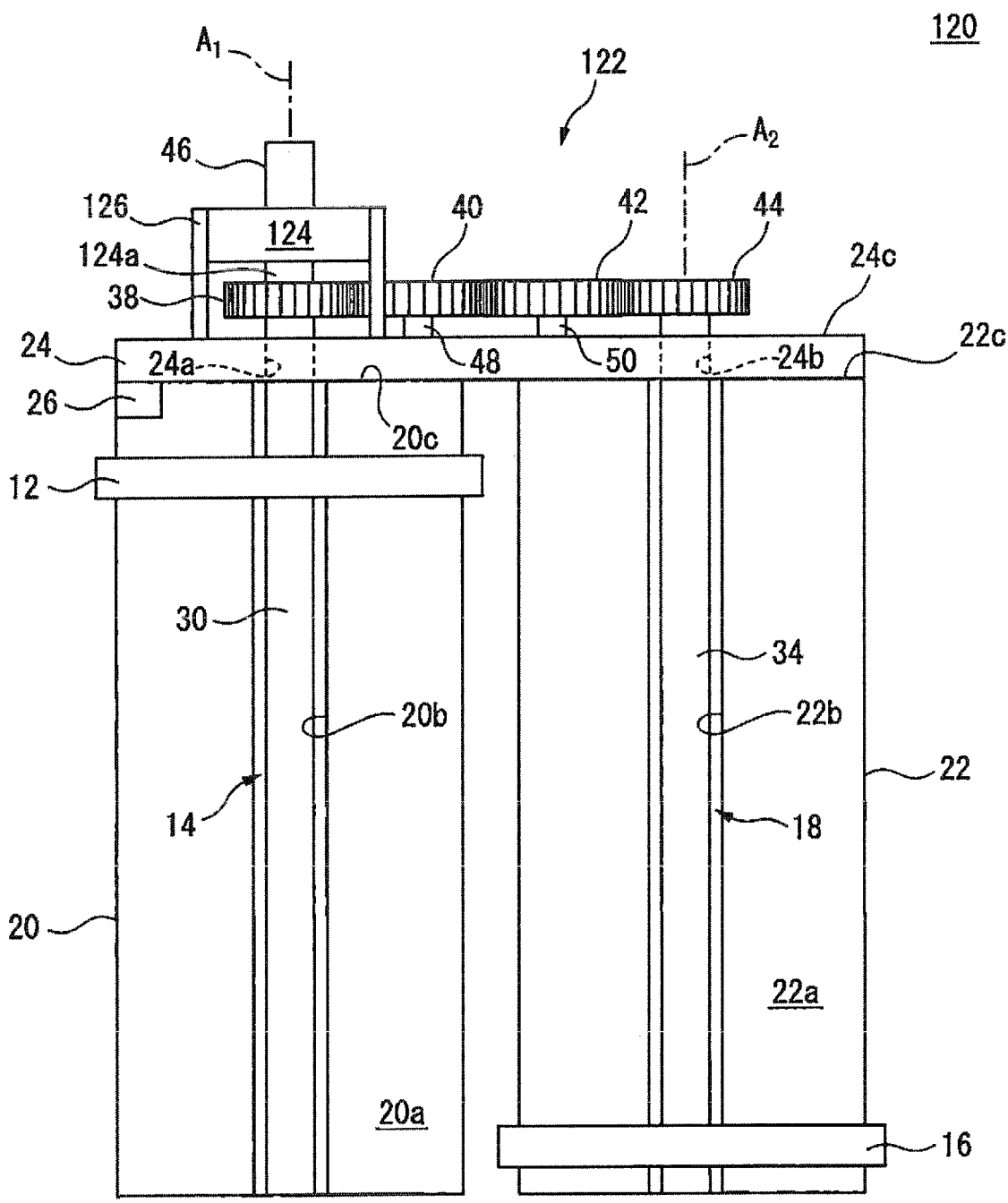
FIG. 11 is a diagram of a feed table device according to still another embodiment, as seen from the rear.

Next, a feed table device 120 according to still another embodiment is described with reference to FIG. 11. The feed table device 120 differs from the above-described feed table device 10 in a configuration of an interlocking mechanism 122. The interlocking mechanism 122 includes the above interlocking members 38, 40, 42 and 44, and a reducer 124.

The reducer 124 is fixed on the top plate 24 via an attachment member 126, and disposed upside of the interlocking member 38 so as to be substantially concentric with the interlocking member 38 with respect to the axis $A_1$. The handling portion 46 is fixed to an input shaft of the reducer 124. On the other hand, an output shaft 124a of the reducer 124 is fixed to the interlocking member 38.

The reducer 124 reduces the rotation number of the handling portion 46 (i.e., the input shaft), and transmits the rotation force to the output shaft 124a and the interlocking member 38. The torque generated at the interlocking member 38 (the output shaft 124a) due to the reducer 124 at this time is increased more than the torque of the handling portion 46 (the input shaft).

Hereinafter, a case is described where the feed table device 120 according to the present embodiment is applied to the robot system 60 illustrated in FIG. 3, instead of the feed table device 10. In this case, at step S8 illustrated in FIG. 4, the control device 64 grips the handling portion 46 of the interlocking mechanism 122 by the end effector 74 of the robot 62, and rotates the handling portion 46 about the axis $A_1$.

Figure 3:
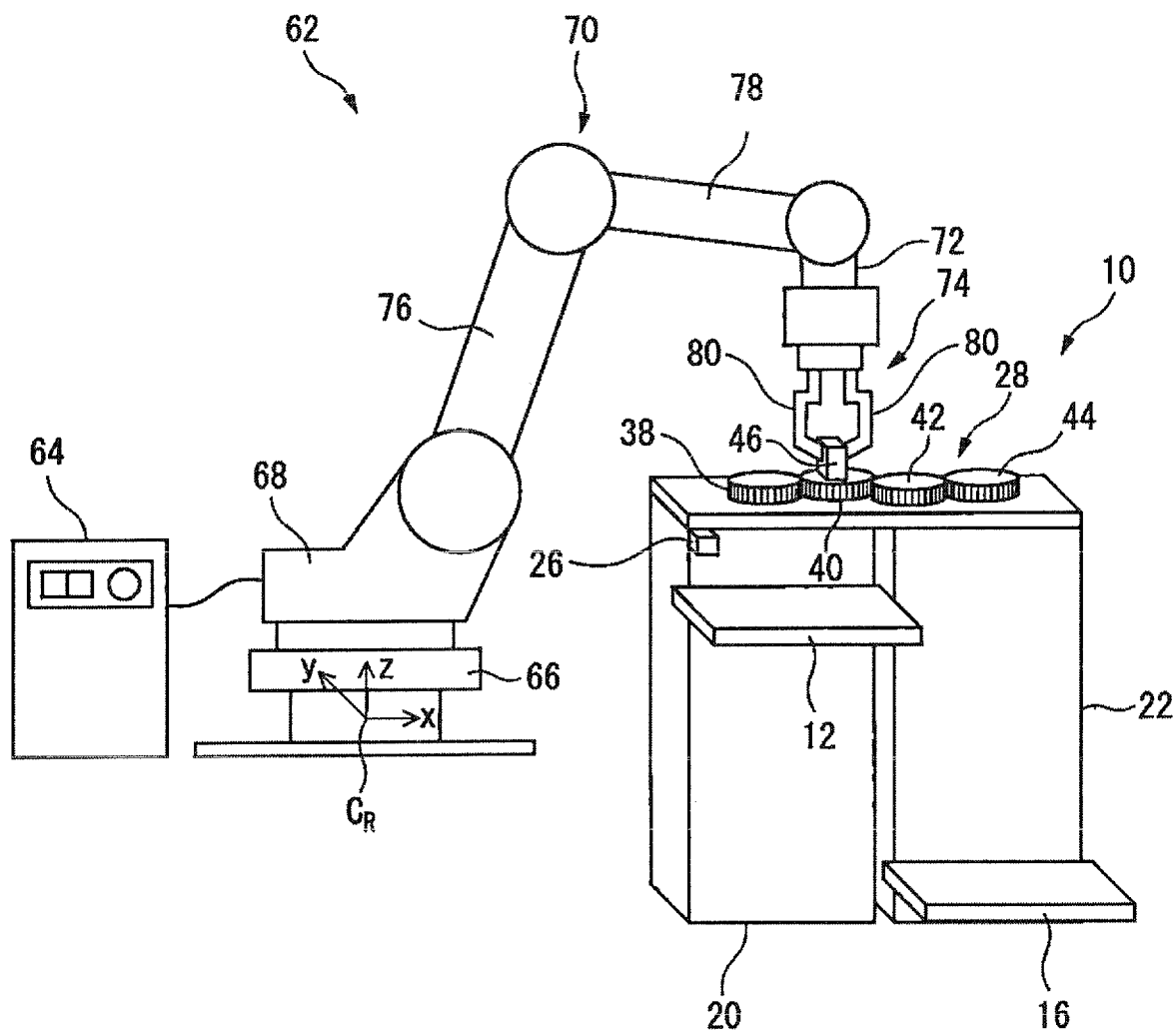
FIG. 3 is a diagram of a robot system according to an embodiment.

If the robot 62 rotates the handling portion 46 by the torque same as that when the handling portion 46 of the interlocking mechanism 28 illustrated in FIG. 3 is rotated, the torque generated at the interlocking members 38, 40, 42, and 44 is greater than that of the interlocking mechanism 28. By increasing the torque in this way, the first table 12 and the second table 16 can be moved in a stable manner even when a heavier pallet P or workpiece is placed on the first table 12 and the second table 16.

On the other hand, if the torque is generated at the interlocking member 38 of the interlocking mechanism 132, that is the same as the torque generated at the interlocking member 38 of the interlocking mechanism 28 illustrated in FIG. 3 when the handling portion 46 of the interlocking mechanism 28 is manipulated, the torque for rotating the handling portion 46 of the interlocking mechanism 122 can be reduced. In this case, the driving force applied to the handling portion 46 by the robot 62 can be reduced, and thus, miniaturization or power saving of the robot 62 can be achieved.

Thus, in the present embodiment, the reducer 124 functions as a driving force enhancing mechanism configured to increase the driving force (the torque) input to the interlocking members 38, 40, 42, and 44. According to this configuration, even when the robot 62 cannot generate a large torque for rotating the end effector 74, it is possible to feed the first table 12 and the second table 16 by the interlocking operation of the robot 62 so as to dispose the first table 12 and the second table 16 at the positions in response to the work.

Figure 12:
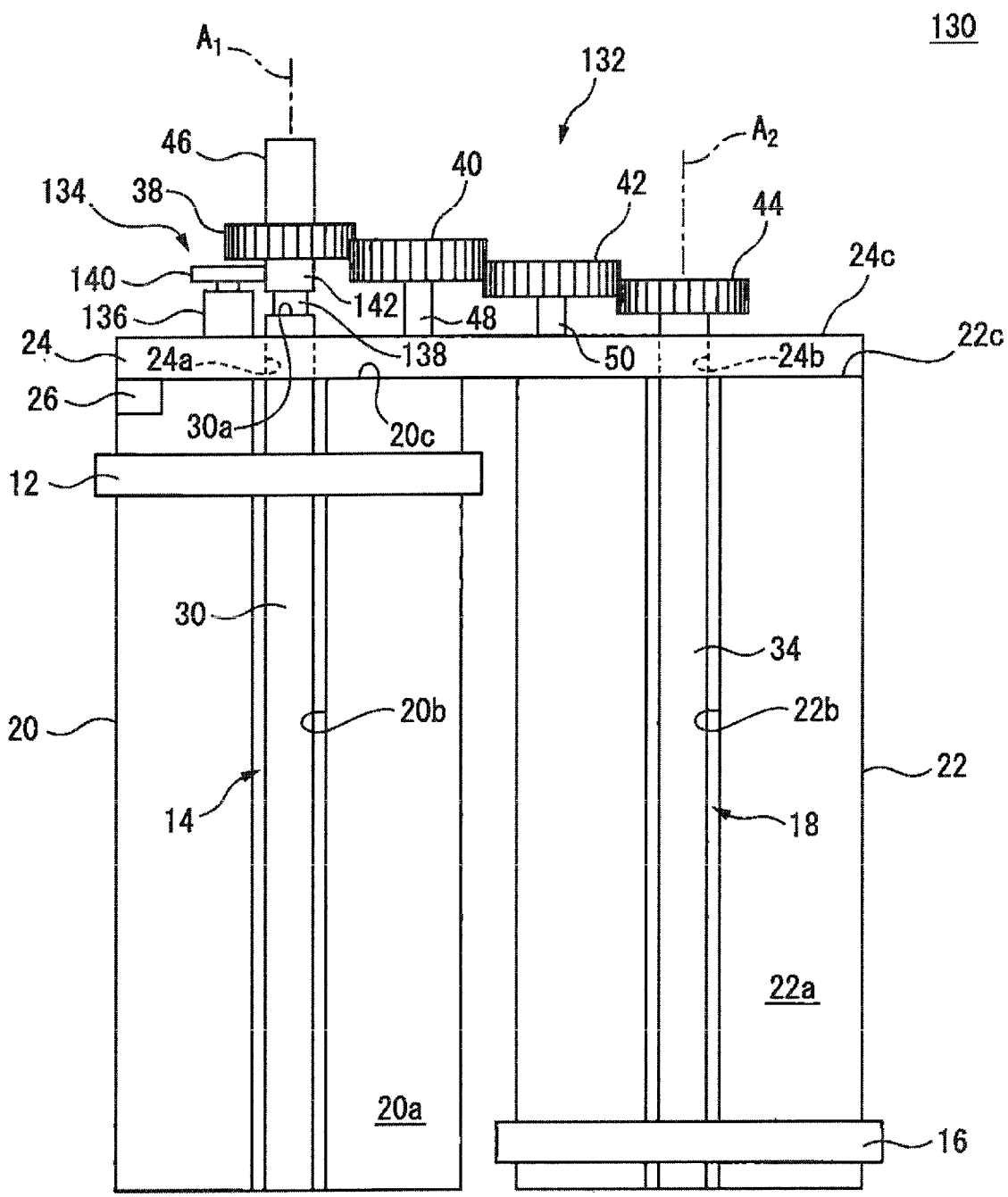
FIG. 12 is a diagram of a feed table device according to still another embodiment, as seen from the rear.

Next, a feed table device 130 according to still another embodiment is described with reference to FIG. 12. The feed table device 130 differs from the above-described feed table device 10 in a configuration of an interlocking mechanism 132. The interlocking mechanism 132 includes the above interlocking members 38, 40, 42 and 44, and an assist device 134.

In the present embodiment, the handling portion 46 is fixed on the upper surface of the interlocking member 38. Furthermore, a force bearing member 142 is fixedly provided at the bottom surface of the interlocking member 38 so as to extend downward therefrom. The force bearing member 142 is circular column shaped, and arranged to be substantially concentric with the interlocking member 38 with respect to the axis $A_1$.

The assist device 134 includes an electric motor 136 and a torque sensor 138. The electric motor 136 is fixed on the upper surface 24c of the top plate 24. A circular column shaped assist member 140 is fixed to an output shaft of the electric motor 136. The electric motor 136 rotates the assist member 140 about an axis parallel to the axis $A_1$.

The torque sensor 138 is interposed between an upper end 30a of the screw shaft 30 of the first feed device 14 and the force bearing member 142, and rotated together with the handling portion 46, the interlocking member 38, and the force bearing member 142. When a torque is applied to the handling portion 46 as the driving force, the torque is applied to the torque sensor 138 via the interlocking member 38 and the force bearing member 142. The torque sensor 138 detects the torque acting thereon about the axis $A_1$.

The assist member 140 and the force bearing member 142 contact (e.g., engage) each other such that the rotation force of the assist member 140 is transmitted to the force bearing member 142. The assist member 140 and the force bearing member 142 may be e.g. gears or circular column shaped members constituted by material of high coefficient of friction (e.g., rubber, resin, etc.).

When the torque detected by the torque sensor 138 exceeds a predetermined threshold, the electric motor 136 rotates the assist member 140 so as to apply additional torque to the force bearing member 142 from the assist member 140. The direction in which the electric motor 136 rotates the assist member 140 is determined such that the direction of the additional torque applied to the force bearing member 142 coincides with the direction of the torque detected by the torque sensor 138.

Specifically, assume that the torque sensor 138 detects the torque in the clockwise direction as viewed from upward. In this case, the electric motor 136 rotates the assist member 140 in the counterclockwise direction as viewed from upward so as to apply the additional torque to the force bearing member 142 from the assist member 140. As a result, the additional torque is applied to the force bearing member 142 in the clockwise direction as viewed from upward. In this way, the assist device 134 reinforces the driving force (i.e., the torque) applied to the interlocking member 38.

Figure 13:
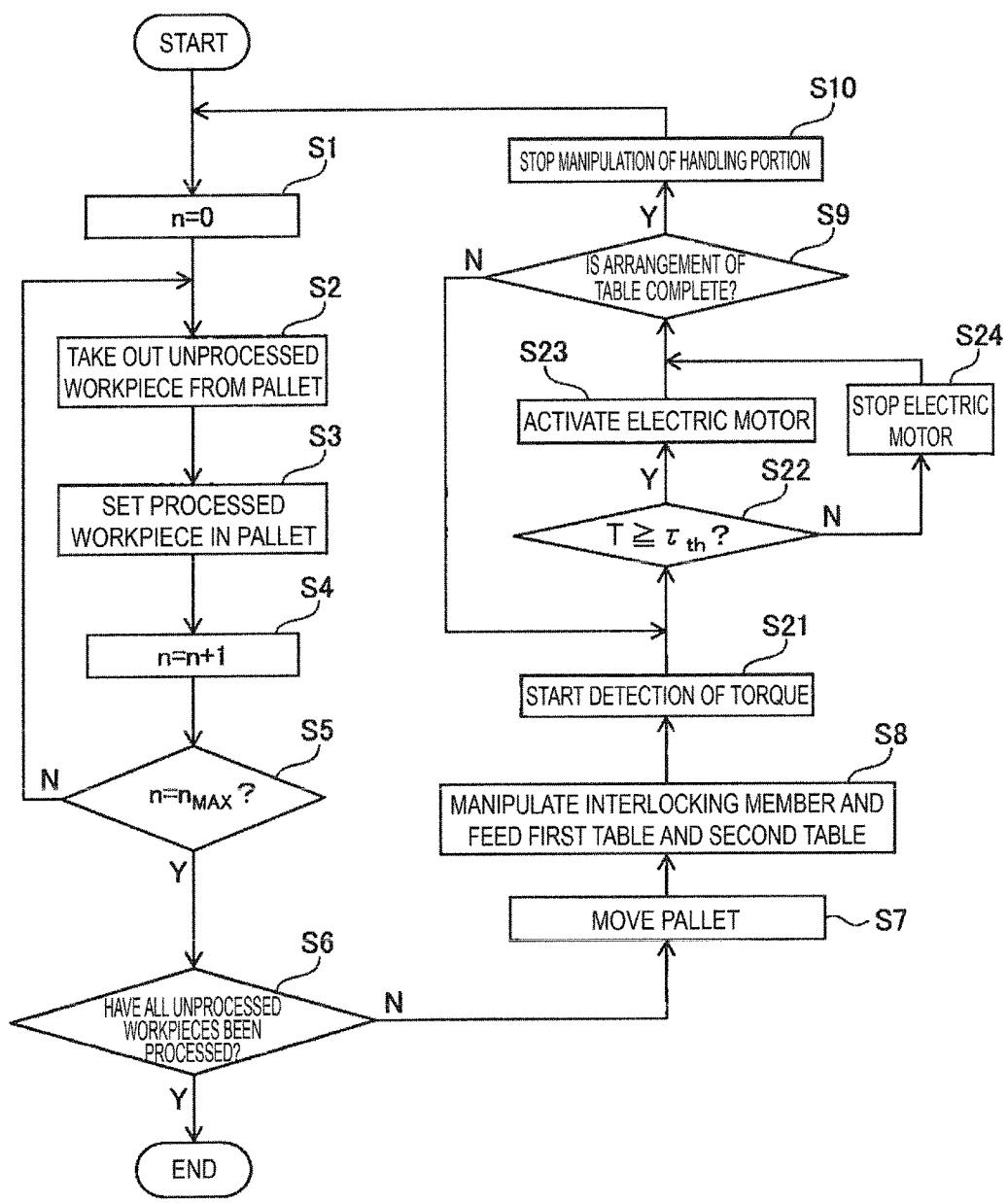
FIG. 13 is a flowchart illustrating an example of an operation flow when the table device illustrated in FIG. 12 is adopted in the robot system illustrated in FIG. 1.

Next, with reference to FIG. 13, an operation in a case where the feed table device 130 is applied to the robot system 60 illustrated in FIG. 3, instead of the feed table device 10, is described. Note that, in the flow illustrated in FIG. 13, processes similar to those of the flow illustrated in FIG. 4 are assigned the same step number, and redundant descriptions thereof will be omitted. If the feed table device 130 is applied to the robot system 60, the electric motor 136 and the torque sensor 138 of the feed table device 130 are communicably connected to the control device 64.

After the start of step S8, at step S21, the control device 64 starts to detect the torque τ by the torque sensor 138. Specifically, the control device 64 transmits a torque detection command to the torque sensor 138. Upon receiving the torque detection command from the control device 64, the torque sensor 138 consecutively (e.g., periodically) detects the torque τ acting thereon, and transmits the detected torque τ to the control device 64. In this way, the control device 64 obtains the driving force (the torque τ) applied to the handling portion 46 through the torque sensor 138.

At step S22, the control device 64 determines whether the torque τ most-recently detected by the torque sensor 138 is equal to or greater than a threshold value $\tau_{th}$. The threshold value $\tau_{th}$ is predetermined by the operator, and stored in the memory of the control device 64. When the control device 64 determines that $\tau \geq \tau_{th}$ is satisfied (i.e., determines YES), it proceeds to step S23. On the other hand, when the control device 64 determines that $\tau < \tau_{th}$ is satisfied (i.e., determines NO), it proceeds to step S24.

At step S23, the control device 64 activates the electric motor 136. Specifically, the control device 64 determines the rotation direction of the electric motor 136 on the basis of the direction of the torque τ most-recently detected by the torque sensor 138. Then, the control device 64 sends an activation command to the electric motor 136, in response to which, the electric motor 136 rotates the assist member 140 in the determined rotation direction so as to apply the additional torque $\tau_a$ to the force bearing member 142 from the assist member 140.

The direction of the additional torque $\tau_a$ applied to the force bearing member 142 at this time coincides with the direction of the torque τ most-recently detected by the torque sensor 138. In this way, a total force of the torque τ applied by the robot to the handling portion 46 and the additional torque $\tau_a$ applied by the electric motor 136 is applied to the interlocking member 38.

On the other hand, when it is determined NO at step S22, at step S24, the control device 64 stops the operation of the electric motor 136, and proceeds to step S9. Note that, when the electric motor 136 is already stopped at the start of step S24, the control device 64 maintains the stopped state of the electric motor 136, and proceeds to step S9.

As described above, according to the present embodiment, it is possible to reinforce the driving force (the torque) applied to the interlocking members 38, 40, 42 and 44 from the robot 62, by the assist device 134. Accordingly, the assist device 134 functions as a driving force reinforcing mechanism configured to increase the driving force (the torque) input to the interlocking members 38, 40, 42 and 44. Due to this driving force reinforcing mechanism, even when the robot 62 cannot generate a large torque for rotating the end effector 74, it is possible to feed the first table 12 and the second table 16 by the interlocking operation of the robot 62 so as to dispose the first table 12 and the second table 16 at the positions in response to the work.

Figure 15:
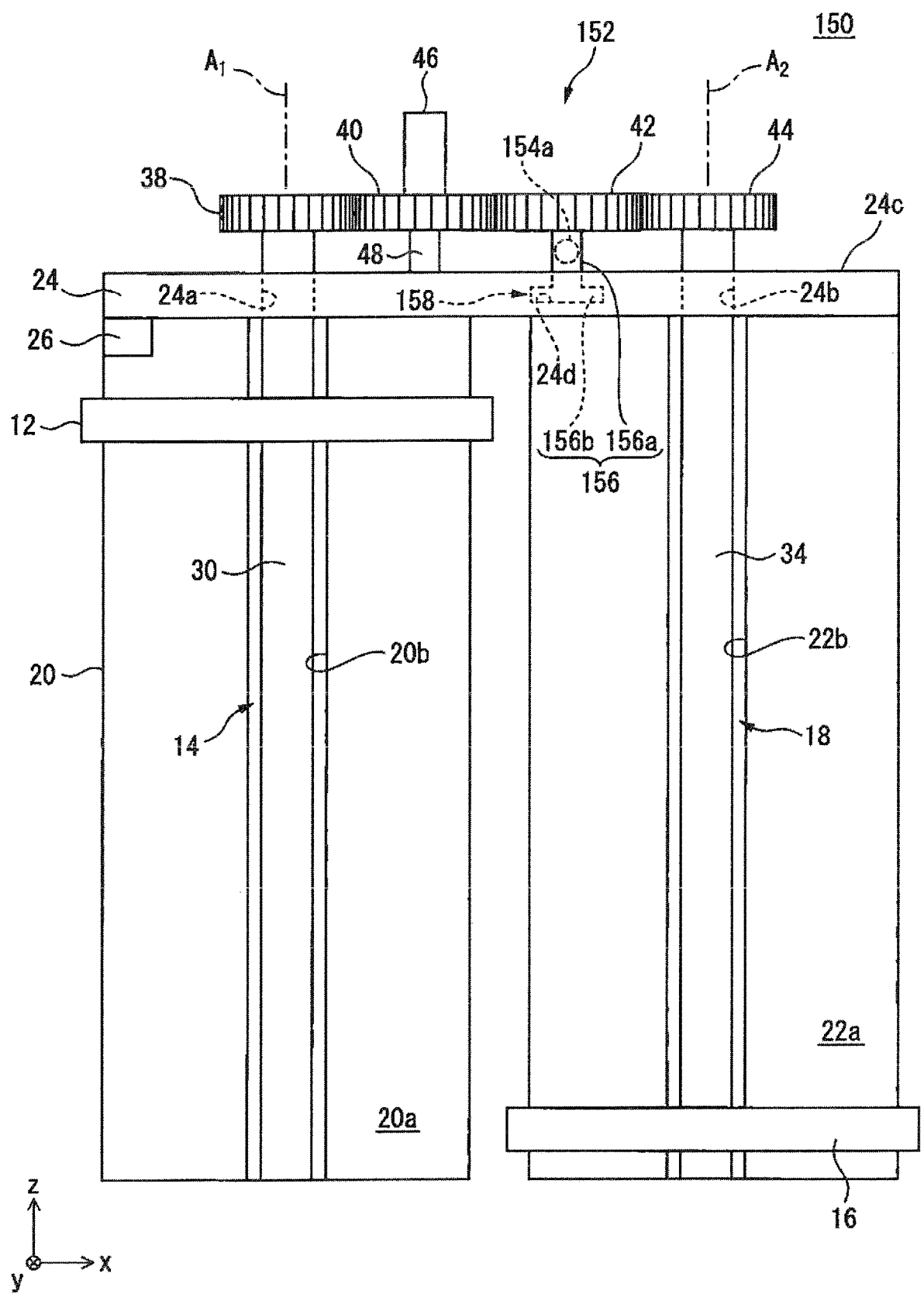
FIG. 15 is a diagram of the feed table device illustrated in FIG. 14, as seen from the rear.
Figure 16:
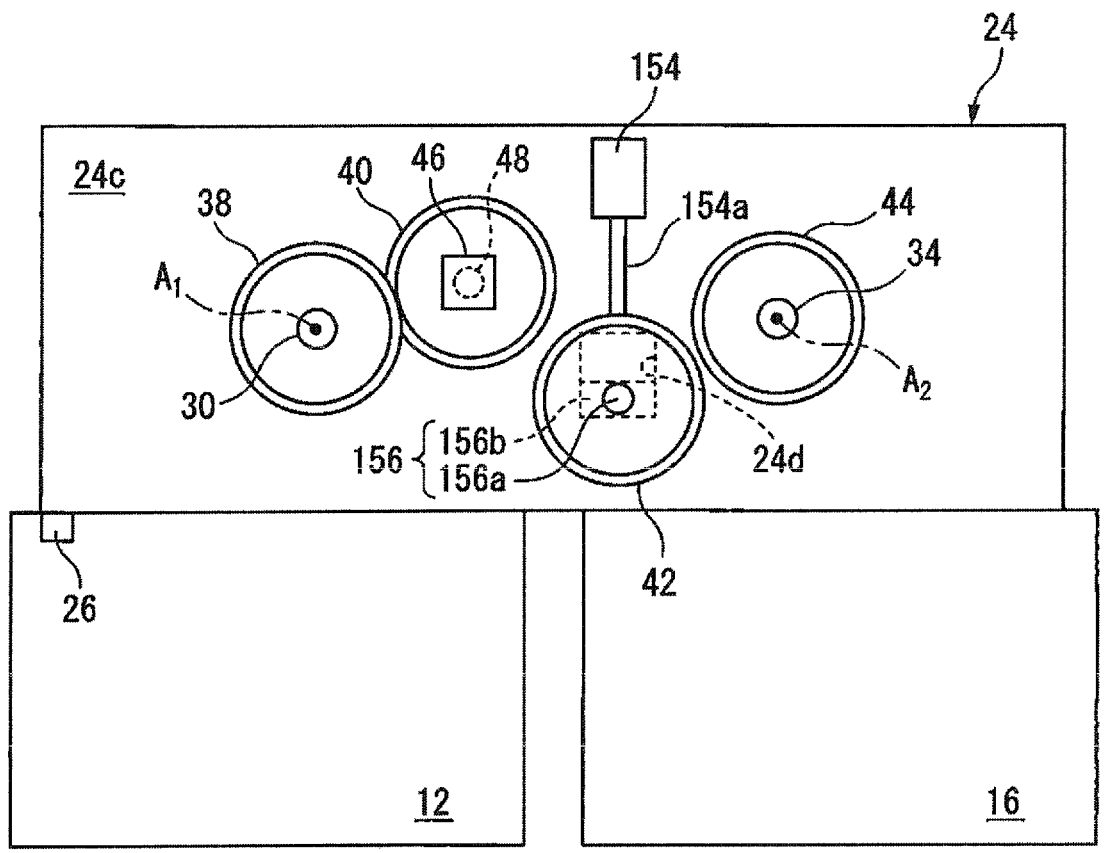
FIG. 16 illustrates a state, in the feed table device illustrated in FIG. 14, in which the one interlocking member is arranged in a disengaged position.

Next, a feed table device 150 according to still another embodiment is described with reference to FIG. 14 to FIG. 16. The feed table device 150 differs from the above-described feed table device 10 in a configuration of an interlocking mechanism 152. The interlocking mechanism 152 includes the above interlocking members 38, 40, 42 and 44, a drive section 154, and a guide mechanism 158.

In the present embodiment, the interlocking member 42 is provided movable in the y-axis direction, and the guide mechanism 158 guides the movement of the interlocking member 42 in the y-axis direction. Specifically, the interlocking member 42 is rotatably fitted to a pin 156. The pin 156 includes a main body 156a and a flange 156b extending outward from the main body 156a. The main body 156a is circular column shaped, and extends in the z-axis direction. The flange 156b extends from the main body 156a to left and right sides.

The top plate 24 is formed with a recess 24d recessed downward from the upper surface 24c. The recess 24d has a substantially T-shaped cross-section as seen from the y-axis direction, and extends in the y-axis direction. The lower end of the main body 156a of the pin 156 and the flange 156b are received in the recess 24d.

The recess 24d guides the sliding motion of the pin 156 in the z-axis direction, while restricting the pin 156 from rotating about the central axis of the main body 156a. The upper end of the main body 156a of the pin 156 is inserted into the central hole of the interlocking member 42, whereby the interlocking member 42 is rotatable about the main body 156a. Further, the interlocking member 42 is movable in the y-axis direction together with the pin 156. In this way, in the present embodiment, the interlocking member 42 is guided to move in the y-axis direction by the engagement between the flange 156b of the pin 156 and the recess 24d. Thus, the flange 156b and the recess 24d constitute the guide mechanism 158.

The drive section 154 is e.g. a hydraulic or pneumatic cylinder, and includes a drive shaft 154a. A distal end of the drive shaft 154a is fixed to the main body 156a of the pin 156. By advancing and retracting the drive shaft 154a, the drive section 154 advances and retracts the interlocking member 42 in the z-axis direction between an engaged position illustrated in FIG. 14 and a disengaged position illustrated in FIG. 16.

Figure 14:
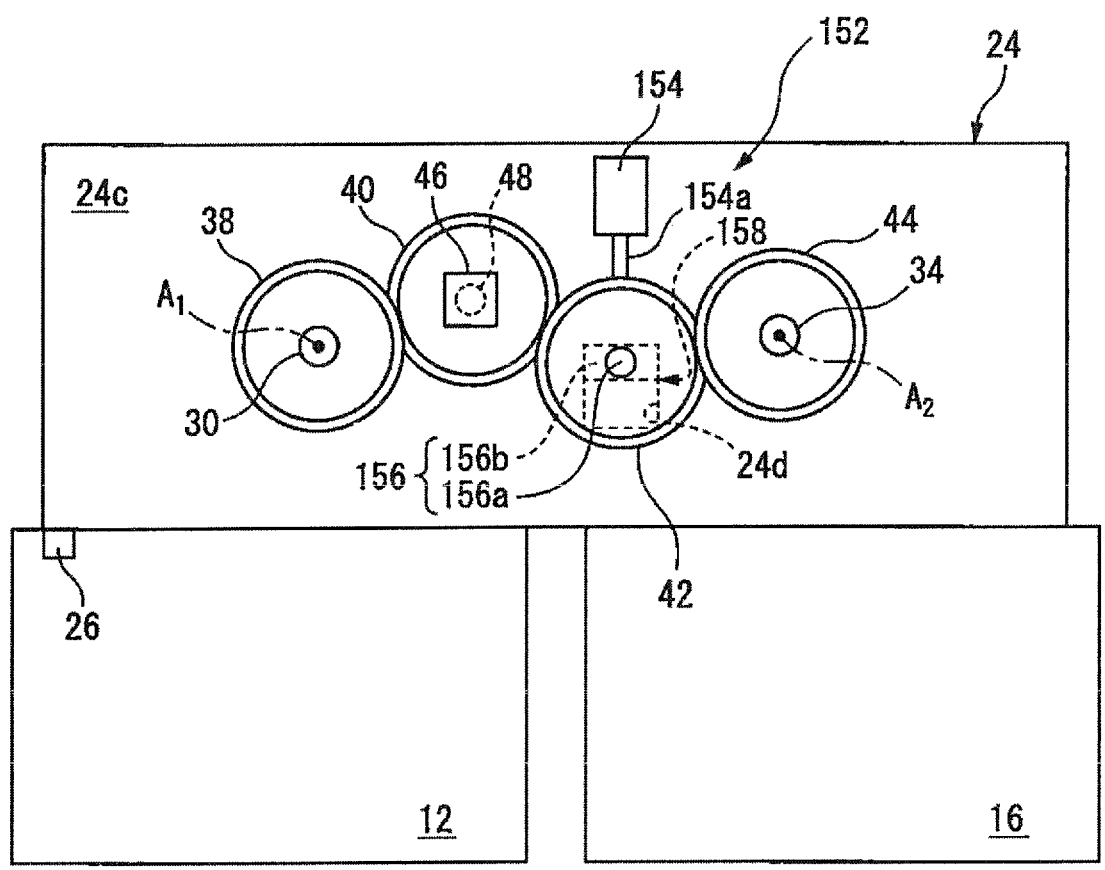
FIG. 14 is a diagram of a feed table device according to still another embodiment, as viewed from upward, illustrating a state in which one interlocking member is disposed in an engaged position.
Figure 14:
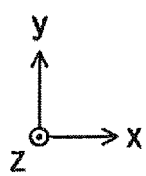

When the interlocking member 42 is arranged at the engaged position illustrated in FIG. 14, the interlocking member 42 engages with the adjacent interlocking members 40 and 44, and transmits the rotation of the interlocking member 40 to the interlocking member 44. On the other hand, when the interlocking member 42 is arranged at the disengaged position illustrated in FIG. 16, the interlocking member 42 is disengaged from the interlocking members 40 and 44, and the rotation of the interlocking member 40 is not transmitted to the interlocking member 44. In this way, in the present embodiment, the interlocking member 42 selectively engages with the interlocking members 40 and 44.

When the feed table device 150 according to the present embodiment is applied to the robot system 60 illustrated in FIG. 3, instead of the feed table device 10, the control device 64 controls the drive section 154 so as to selectively engage the interlocking member 42 with the interlocking members 40 and 42, in response to the work. The first table 12 and the second table 16 can both be moved if the interlocking member 42 is disposed at the engaged position, while only the first table 12 can be moved if the interlocking member 42 is disposed at the disengaged position. According to this configuration, it is possible to flexibly adapt to a wider variety of work.

Note that, in the above-described feed table device 10, the second feed device is configured such that the second table 16 is moved downward as the screw shaft 34 is rotated in the clockwise direction as viewed from upward. However, the second feed device may be configured such that the second table 16 is moved upward as the screw shaft 34 is rotated in the clockwise direction as viewed from upward.

In this case, the interlocking mechanism 28 may include (2n−1) number of interlocking members. For example, the interlocking member 42 illustrated in FIG. 1 is omitted, and the interlocking members 40 and 44 are engaged with each other. In this case, when the interlocking member 40 is rotated, the screw shafts 30 and 34 are rotated in the same direction as viewed from upward, as a result, the first table 12 and the second table 16 can be moved in the opposite directions.

A vision sensor may be applied to the robot system 60 described above. In this case, at step S2 described above, the control device 64 may image the unprocessed workpiece set in the uppermost pallet P on the first table 12 by the vision sensor, and acquire the position data in the robot coordinate system $C_R$ of the unprocessed workpiece.

Further, at step S3, the control device 64 may image the uppermost pallet P on the second table 16 by the vision sensor, and acquire the position data in the robot coordinate system $C_R$ of the set position where the processed workpiece are to be set in the uppermost pallet. In this case, since the pallet P and the workpiece can be arranged at arbitrary positions in the tables 12 and 16, it is not necessary to provide the jig for positioning the pallet P and the workpiece.

Further, at step S7, the control device 64 may image the uppermost pallet P on the first table 12 by the vision sensor, and acquire the position data in the robot coordinate system $C_R$ of the gripping portion G of the uppermost pallet P. Further, at step S8, the control device 64 may image the handling portion 46 by the vision sensor, and acquire the position data in the robot coordinate system $C_R$ of the handling portion 46. In this case, the handling portion 46 can be reliably gripped by the end effector 74, at whatever rotation angle the handling portion 46 is disposed at the start of step S8.

In the feed table device 10, the gear ratios (the reduction ratios) of the interlocking members 38 and 40, 40 and 42, and 42 and 44 may be any ratios. Further, in the feed table device 90, the gear ratios (the reduction ratios) of the interlocking members 38 and 42, and 42 and 44 may be any ratios. Furthermore, in the feed table device 100 or 110, the gear ratio (the reduction ratio) of the interlocking members 38 and 44 may be any ratios. Further, the interlocking member 38, 40, 42, 44, or 104 is not limited to a gear, but may be a member comprised of material of high coefficient of friction (rubber, resin, or the like).

The installation position of the handling portion 46 is not limited to the position of the above-described embodiments. For example, in the feed table device 10, the handling portion 46 may be fixed to any of the interlocking members 38, 42, and 44. Further, in the feed table device 120, the handling portion 46 and the reducer 124 may be provided at any of the interlocking members 40, 42, and 44. In addition, in the feed table device 130, the handling portion 46, the force bearing member 142, and the assist device 134 may be provided at any of the interlocking members 40, 42, and 44.

In the feed table device 150, the interlocking member 40 may be provided movable in the y-axis direction, and the drive section 154 may be configured to advance and retract the interlocking member 40. In the embodiments described above, the workpiece may be directly placed at a predetermined position on the table 12 or 16, without providing the pallet P. Further, the table 12 or 16 may have any shape as long as the pallet P or the workpiece can be placed thereon.

The position sensor 26 is not limited to the proximity switch, but may be a displacement gauge or a linear scale or the like, that is capable of detecting the position (z-axis coordinate, a distance from the position sensor 26) of the first table 12 (the pallet on the first table 12) or the second table 16 (the pallet on the second table). In this case, at above-described step S9, the control device 64 may determine whether the detection result of the position sensor 26 (the z axis coordinate, the distance) is within a predetermined allowable range, and may determine YES when the detection result is within the predetermined allowable range.

The feed device 14 or 18 in the robot system 60 may not be the ball screw device. For example, each of the feed devices 14 and 18 may be a device capable of conveying the pallet P or the workpiece, such as a belt conveyor. In this case, the interlocking member is interposed between two belt conveyors so as to interlock the motions of the two belt conveyors. Further, the feed devices 14 and 18 may be configured to move the tables 12 and 16 along the x-y plane (e.g., the x-axis).

Further, in the robot system 60, the robot 62 loads and unloads the workpiece into and from the processing machine. However, the robot 62 may load and unload a wafer into and from a semiconductor processing device, or may convey a member to any other device.

Further, the robot 62 is not limited to the vertical articulated robot, but may be any other type of robot, such as a horizontal articulated robot, a parallel link robot, etc. Further, in place of the openable and closable fingers 80, the end effector 74 may have a suction portion capable of attracting an object, for example. Further, the end effector 74 may be provided with a chuck configured to operate the handling portion 46, in addition to (or instead of) the fingers 80 (the suction portion). For example, the chuck may have a hole that receives and engages the handling portion 46.

Features of the various embodiments described above may be combined. For example, the assist device 134 illustrated in FIG. 12 may be applied to the interlocking mechanism 122 illustrated in FIG. 11. In this case, the driving force enhancing mechanism includes the reducer 124 and the assist device 134. Further, in the interlocking mechanism 92 illustrated in FIG. 8, the interlocking member 42 may be provided movable, and the drive section 154 illustrated in FIG. 14 may be applied to the interlocking mechanism 92 and cause the interlocking member 42 to selectively engage with the interlocking member 44.

While the present disclosure has been described through specific embodiments, the above-described embodiments do not limit the invention as defined by the appended claims.

The invention claimed is:

1. A robot system comprising:
a robot having an end effector;
a first table on which the robot carries out a work;
a second table on which the robot carries out a work;
a first feed device configured to feed the first table;
a second feed device configured to feed the second table;
an interlocking member configured to mechanically interlock motions of the first feed device and the second feed device, so as to move the first table and the second table in synchronization with each other in a same direction or in opposite directions; and
a control device configured to control:
a first operation of the robot for work; to use the end effector to move items to or from at least one of the first table or the second table, and
a second operation of the robot, which is different from the first operation, to use the end effector to manipulate the interlocking member to move the first table and the second table in synchronization with each other.

2. The robot system of claim 1, wherein the control device controls the second operation on the basis of a relationship between a movement amount of the first table by the first feed device, a movement amount of the second table by the second feed device, and a manipulation amount of the interlocking member by the robot.

3. The robot system of claim 1, further comprising a position sensor configured to detect a position of the first table or the second table,
wherein the control device controls the second operation on the basis of a detection result of the position sensor.

4. The robot system of claim 1, wherein the interlocking member moves the first table and the second table in directions opposite to each other, in accordance with the second operation of the robot.

5. The robot system of claim 1, wherein the interlocking member moves the first table and the second table by a same distance, in accordance with the second operation of the robot.

6. The robot system of claim 1, wherein the first feed device includes a first screw shaft, and the second feed device includes a second screw shaft,
wherein the interlocking member includes a gear train disposed between the first screw shaft and the second screw shaft.

* * * * *